(12) United States Patent
Murray et al.

(10) Patent No.: US 12,708,902 B2
(45) Date of Patent: Aug. 18, 2026

(54) RFID ENABLED SPECIMEN HOLDER

(71) Applicant: TMRW Life Sciences, Inc., New York, NY (US)

(72) Inventors: Alan Leroy Murray, New York, NY (US); Brian Joseph Bixon, Jersey City, NJ (US)

(73) Assignee: TMRW Life Sciences, LLC, Coconut Creek, FL (US)

( * ) Notice: Subject to any disclaimer, the term of this patent is extended or adjusted under 35 U.S.C. 154(b) by 1058 days.

(21) Appl. No.: 17/776,203

(22) PCT Filed: Nov. 13, 2020

(86) PCT No.: PCT/US2020/060565
§ 371 (c)(1),
(2) Date: May 11, 2022

(87) PCT Pub. No.: WO2021/097330
PCT Pub. Date: May 20, 2021

(65) Prior Publication Data

US 2022/0388005 A1 Dec. 8, 2022

Related U.S. Application Data

(60) Provisional application No. 62/936,133, filed on Nov. 15, 2019.

(51) Int. Cl.
*B01L 3/00* (2006.01)
*A01N 1/147* (2025.01)

(52) U.S. Cl.
CPC .............. *B01L 3/545* (2013.01); *A01N 1/147* (2025.01); *B01L 2200/0684* (2013.01);
(Continued)

(58) Field of Classification Search
CPC ...... B65D 81/18; B65D 83/763; B65D 85/50; A01N 1/147; B01L 3/5453;
(Continued)

(56) References Cited

U.S. PATENT DOCUMENTS 4,573,581 A 3/1986 Galloway et al.
D300,583 S 4/1989 Smith
(Continued)

FOREIGN PATENT DOCUMENTS

AU 2011357590 B2 9/2015
AU 2017287017 A1 1/2019
(Continued)

OTHER PUBLICATIONS

Chapter 18—Mechanical Fastening, Michael J. Troughton, Handbook of Plastics Joining (Second Edition), William Andrew Publishing, 2009, pp. 175-201, ISBN 9780815515814, https://doi.org/10.1016/B978-0-8155-1581-4.50020-2.*
(Continued)

*Primary Examiner* — Charles Capozzi
*Assistant Examiner* — Jacqueline Brazin
(74) *Attorney, Agent, or Firm* — Cozen O'Connor

(57) ABSTRACT

A specimen holder includes a stick and an RFID tag. The stick is elongate along a longitudinal direction, and has a distal end and a proximal end opposite the distal end with respect to the longitudinal direction. The stick includes an outer surface and a distal portion of the outer surface that is closer to the distal end than the proximal end. The stick further includes an internal cavity that extends from a first terminal end to a second terminal end. The stick includes a midplane that is normal to the longitudinal direction, and the midplane is located equidistant between the distal end and the proximal end. The first terminal end, the second terminal end and an entirety of the internal cavity are all located
(Continued)

between the midplane and the proximal end. The RFID tag is positioned within the internal cavity.

15 Claims, 10 Drawing Sheets

(52) U.S. Cl.
CPC ... *B01L 2300/023* (2013.01); *B01L 2300/042* (2013.01); *B01L 2300/1894* (2013.01)

(58) Field of Classification Search
CPC ....... B01L 2300/022; B01L 2300/1894; G06K 7/10297; G06K 19/0723; G06K 19/07749; G06K 19/07758; G16H 40/20
See application file for complete search history.

(56) References Cited

U.S. PATENT DOCUMENTS

D310,264 S 8/1990 Leoncavallo et al.
5,176,202 A 1/1993 Richard
5,355,684 A 10/1994 Guice
5,545,562 A 8/1996 Cassou et al.
D382,809 S 8/1997 Aldrich et al.
D382,810 S 8/1997 Aldrich et al.
5,711,446 A 1/1998 Jeffs et al.
5,741,462 A 4/1998 Nova et al.
5,751,629 A 5/1998 Nova et al.
5,874,214 A 2/1999 Nova et al.
D408,145 S 4/1999 Au
5,921,102 A 7/1999 Vago
5,925,562 A 7/1999 Nova et al.
5,964,095 A 10/1999 Coelho et al.
6,066,300 A 5/2000 Carey et al.
6,100,026 A 8/2000 Nova et al.
6,141,975 A 11/2000 Tatsumi
6,156,566 A 12/2000 Bryant
6,302,327 B1 10/2001 Coelho et al.
6,329,139 B1 12/2001 Nova et al.
6,564,120 B1 5/2003 Richard et al.
D484,797 S 1/2004 Kipperman et al.
6,701,743 B1 3/2004 Durst et al.
D496,398 S 9/2004 Greenberg
6,888,063 B1 5/2005 Lien et al.
D506,550 S 6/2005 Greenberg
7,070,053 B1 7/2006 Abrams et al.
7,091,864 B2 8/2006 Veitch et al.
D535,478 S 1/2007 Uffner et al.
7,278,328 B2 10/2007 Massaro
7,316,896 B2 1/2008 Kuwayama et al.
7,350,703 B2 4/2008 Ambartsoumian
7,411,508 B2 8/2008 Harazin et al.
D576,488 S 9/2008 Miota et al.
D592,966 S 5/2009 Nissen
7,661,591 B2 2/2010 Dearing et al.
7,694,886 B2 4/2010 Tan et al.
7,861,540 B2 1/2011 Cloutier et al.
7,870,748 B2 1/2011 Byrne
D642,697 S 8/2011 Gaefvert
8,097,199 B2 1/2012 Abbott et al.
8,098,162 B2 1/2012 Abbott et al.
8,115,599 B2 2/2012 Harazin et al.
8,168,138 B2 5/2012 Che et al.
8,378,827 B2 2/2013 Davidowitz et al.
D682,045 S 5/2013 Myoung
8,444,058 B2 * 5/2013 Masin .............. G06K 19/07749 235/492
8,502,645 B2 8/2013 Thomas et al.
8,710,958 B2 4/2014 Yang et al.
8,790,597 B2 7/2014 Childs et al.
8,852,536 B2 10/2014 Davidowitz et al.
8,872,627 B2 * 10/2014 Davidowitz ............ B01L 3/508 340/10.1
8,884,743 B2 11/2014 Chaffey et al.
8,919,532 B2 12/2014 Buergermeister et al.
8,937,550 B2 1/2015 Phaneuf et al.
9,028,754 B2 5/2015 Winter et al.
9,033,251 B2 5/2015 Weisshaupt et al.
D733,314 S 6/2015 Lui
9,140,487 B2 9/2015 Chaffey et al.
9,163,869 B2 10/2015 Warhurst et al.
9,211,540 B2 12/2015 Lansdowne
9,280,738 B2 3/2016 Dor et al.
9,289,770 B2 3/2016 Lavi
9,297,499 B2 3/2016 Jimenez-Rios et al.
9,418,265 B2 8/2016 Morris et al.
9,431,692 B2 8/2016 Davidowitz et al.
D768,868 S 10/2016 Inoue
D771,271 S 11/2016 Zingre
9,501,734 B2 * 11/2016 Morris .................. G06K 19/08 235/492
9,516,876 B2 12/2016 Inoue
D777,941 S 1/2017 Piramoon
9,538,746 B2 1/2017 Inoue
9,538,747 B2 1/2017 Inoue
9,547,782 B2 1/2017 Lansdowne
9,551,649 B2 1/2017 Houghton et al.
9,589,225 B2 3/2017 Morris
9,619,678 B2 4/2017 Morris et al.
9,697,457 B2 7/2017 Morris
9,723,832 B2 8/2017 Camenisch et al.
9,736,890 B2 8/2017 Chaffey et al.
9,764,325 B2 9/2017 Davidowitz
9,796,574 B2 10/2017 Frey et al.
9,928,457 B2 3/2018 Mcdowell
D816,165 S 4/2018 Haug
D835,472 S 12/2018 Seiders et al.
10,156,386 B2 12/2018 Bartlett et al.
D840,684 S 2/2019 Luburic
10,207,270 B2 2/2019 Lansdowne
10,241,015 B2 3/2019 Hollabaugh et al.
D845,139 S 4/2019 Wilson et al.
10,328,431 B2 6/2019 Davidowitz
10,401,082 B2 9/2019 Coradetti et al.
10,493,457 B2 12/2019 Croquette et al.
10,531,657 B2 1/2020 Farrington et al.
D874,875 S 2/2020 Huang
10,561,141 B2 2/2020 Suzuki et al.
D881,568 S 4/2020 Luburic
10,677,810 B2 6/2020 Grimwood et al.
D890,948 S 7/2020 Figueredo et al.
10,748,050 B2 8/2020 Morris et al.
D910,836 S 2/2021 Sandberg et al.
10,989,636 B2 4/2021 Gutelius et al.
D928,343 S 8/2021 Bonnoitt et al.
D930,186 S 9/2021 Kim
D931,128 S 9/2021 Li
D932,906 S 10/2021 Schulz
11,148,143 B2 10/2021 Davidowitz et al.
11,175,298 B2 11/2021 Neeper et al.
D938,053 S 12/2021 Xiao
D945,271 S 3/2022 Halgren et al.
D963,194 S 9/2022 Bixon et al.
D981,801 S 3/2023 Wu
11,697,119 B2 7/2023 Davidowitz et al.
12,006,126 B2 6/2024 Davidowitz et al.
2002/0030972 A1 3/2002 Ali et al.
2002/0190845 A1 12/2002 Moore
2002/0195234 A1 12/2002 Wu
2002/0196146 A1 12/2002 Moore
2003/0017082 A1 1/2003 Van Deursen et al.
2003/0174046 A1 9/2003 Abrams
2004/0100415 A1 5/2004 Veitch et al.
2005/0005614 A1 1/2005 Iarocci et al.
2005/0016198 A1 1/2005 Wowk et al.
2005/0237195 A1 10/2005 Urban
2005/0247782 A1 11/2005 Ambartsoumian
2006/0051239 A1 3/2006 Massaro
2006/0283945 A1 12/2006 Excoffier et al.
2007/0068208 A1 3/2007 Norman et al.
2007/0172396 A1 7/2007 Neeper et al.
2008/0012687 A1 1/2008 Rubinstein
2008/0024301 A1 1/2008 Fritchie et al.

(56) References Cited

U.S. PATENT DOCUMENTS

2008/0121700 A1 5/2008 Dearing et al.
2008/0239478 A1 10/2008 Tafas et al.
2009/0015430 A1 1/2009 Harazin et al.
2009/0026907 A1 1/2009 Davidowitz et al.
2009/0029341 A1 1/2009 Fuhr et al.
2009/0188272 A1 7/2009 Cloutier et al.
2009/0318751 A1 12/2009 Lansdowne
2009/0322486 A1 12/2009 Gerstel
2010/0028214 A1 2/2010 Howard et al.
2010/0123551 A1 5/2010 Fritchie
2010/0141384 A1 6/2010 Chen et al.
2010/0281886 A1 11/2010 Shaham et al.
2010/0302040 A1 12/2010 Davidowitz et al.
2011/0088424 A1 4/2011 Cloutier et al.
2011/0137812 A1 6/2011 Sherga
2011/0143452 A1 6/2011 Che et al.
2011/0181875 A1 7/2011 Nakahana et al.
2011/0199187 A1 8/2011 Davidowitz
2011/0199188 A1 8/2011 Dickson
2011/0308271 A1 12/2011 Schryver
2011/0312102 A1 12/2011 Jo
2012/0060514 A1 3/2012 Warhurst et al.
2012/0060520 A1 3/2012 Collins et al.
2012/0060539 A1 3/2012 Hunt et al.
2012/0060541 A1 3/2012 Hunt et al.
2012/0064603 A1 3/2012 Childs et al.
2012/0187197 A1 7/2012 Masin
2012/0212330 A1 8/2012 Halberthal et al.
2012/0256806 A1 10/2012 Davidowitz et al.
2012/0272500 A1 11/2012 Reuteler
2012/0293338 A1 11/2012 Chaffey et al.
2013/0011226 A1 1/2013 Camenisch et al.
2013/0048711 A1 2/2013 Burns et al.
2013/0076215 A1 3/2013 Davidowitz et al.
2013/0106579 A1 5/2013 Aubert et al.
2013/0119562 A1 5/2013 Shimizu et al.
2013/0151004 A1 6/2013 Winter et al.
2013/0152710 A1 6/2013 Laugharn et al.
2013/0217107 A1 8/2013 Pederson et al.
2014/0008042 A1 1/2014 Schryver et al.
2014/0008355 A1 1/2014 Chaffey et al.
2014/0069119 A1 3/2014 Katkov et al.
2014/0157798 A1 6/2014 Jimenez-Rios et al.
2014/0171829 A1 6/2014 Holmes et al.
2014/0230472 A1 8/2014 Coradetti et al.
2014/0352456 A1 12/2014 Davidowitz
2015/0045782 A1 2/2015 Ottanelli
2015/0122887 A1 5/2015 Morris et al.
2015/0125574 A1 5/2015 Arent et al.
2015/0204598 A1 7/2015 Affleck et al.
2015/0205986 A1 7/2015 Morris et al.
2015/0273468 A1 10/2015 Croquette et al.
2015/0356398 A1 12/2015 Morris
2015/0379390 A1 12/2015 Morris
2016/0026911 A1 1/2016 Morris et al.
2016/0095309 A1 4/2016 Reuteler
2016/0101908 A1 4/2016 Minnette et al.
2016/0143270 A1 5/2016 Schryver
2016/0175837 A1 6/2016 Chaffey et al.
2016/0236387 A1 8/2016 Carroll et al.
2016/0288999 A1 10/2016 Caveney et al.
2016/0289000 A1 10/2016 Caveney et al.
2016/0341464 A1 11/2016 Bagwell
2016/0349172 A1 12/2016 Houghton et al.
2016/0353730 A1 12/2016 Harston et al.
2016/0358062 A1 12/2016 Morris
2017/0113909 A1 4/2017 Frey et al.
2017/0122846 A1 5/2017 Holmes et al.
2017/0156312 A1* 6/2017 Farrington et al. .... A01N 1/162
62/51.1
2017/0166865 A1 6/2017 Peng
2017/0184479 A1 6/2017 Schryver et al.
2017/0320054 A1 11/2017 Crum et al.
2018/0020659 A1 1/2018 Camenisch et al.
2018/0043364 A1 2/2018 Davidowitz
2018/0086533 A1 3/2018 Nelland
2018/0100868 A1 4/2018 Grimwood et al.
2018/0135806 A1 5/2018 Qu et al.
2018/0154359 A1 6/2018 Ueyama
2018/0202908 A1 7/2018 Croquette et al.
2018/0368394 A1 12/2018 Nelland et al.
2019/0000073 A1 1/2019 Pedersen et al.
2019/0025280 A1 1/2019 Kaditz et al.
2019/0060892 A1 2/2019 Davidowitz et al.
2019/0092555 A1 3/2019 Ma et al.
2019/0162639 A1 5/2019 Gutelius et al.
2019/0193078 A1 6/2019 Fiondella et al.
2019/0215948 A1 7/2019 Arnitz et al.
2019/0250181 A1 8/2019 Seeber
2019/0276233 A1 9/2019 Caveney et al.
2019/0293344 A1 9/2019 Sun et al.
2019/0297877 A1* 10/2019 Komatsu et al. ............................ G06K 19/07758
435/303.1
2020/0093122 A1 3/2020 Lin et al.
2020/0097788 A1 3/2020 Pedersen et al.
2020/0107541 A1 4/2020 Blair et al.
2020/0229427 A1 7/2020 Kilbride et al.
2020/0229429 A1 7/2020 Blair et al.
2020/0229430 A1 7/2020 Blair et al.
2020/0229431 A1 7/2020 Blair et al.
2020/0281191 A1 9/2020 Ally et al.
2021/0121876 A1 4/2021 Blair et al.
2021/0135061 A1 5/2021 Navabi
2021/0244018 A1 8/2021 Sandy et al.
2022/0192182 A1 6/2022 Bixon et al.

FOREIGN PATENT DOCUMENTS

CA 2972315 A1 8/2016
CN 105857932 A 8/2016
CN 105890965 A 8/2016
CN 106102460 A 11/2016
CN 205815766 U 12/2016
CN 106370879 A 2/2017
CN 106871546 A 6/2017
CN 107624751 A 1/2018
CN 108112576 A 6/2018
CN 207595583 U 7/2018
CN 207663251 U 7/2018
CN 207675193 U 7/2018
CN 108541702 A 9/2018
CN 109258627 A 1/2019
CN 208425434 U 1/2019
CN 110476952 A 11/2019
CN 110517737 A 11/2019
CN 209677194 11/2019
CN 110550327 A 12/2019
CN 110583618 A 12/2019
CN 110589332 A 12/2019
CN 110645752 A 1/2020
CN 110667986 A 1/2020
CN 210709605 U 6/2020
CN 210709624 U 6/2020
CN 210711515 U 6/2020
CN 111771211 A 10/2020
CN 213863260 U 8/2021
CN 213863569 U 8/2021
DE 102011012887 A1 8/2012
DE 102016008869 A1 1/2018
EP 0411224 A2 2/1991
EP 0706825 A1 4/1996
EP 0811140 A1 12/1997
EP 1002211 A2 5/2000
EP 1366998 A2 3/2004
EP 1366998 B1 1/2006
EP 1916492 A1 4/2008
EP 2301857 A1 3/2011
EP 2315163 A1 4/2011
EP 2358196 B1 8/2011
EP 2467465 A1 6/2012
EP 2124171 B1 8/2012
EP 2666694 B1 7/2014
EP 1888239 B1 10/2014

(56) References Cited

FOREIGN PATENT DOCUMENTS

| | | | |
|---|---|---|---|
| EP | 1981692 | B1 | 6/2015 |
| EP | 2498968 | B1 | 9/2015 |
| EP | 2335182 | B1 | 10/2015 |
| EP | 2297736 | B1 | 2/2016 |
| EP | 2292332 | B1 | 7/2016 |
| EP | 2765183 | B1 | 7/2016 |
| EP | 2614320 | B1 | 10/2016 |
| EP | 2354729 | B1 | 12/2016 |
| EP | 2873497 | B1 | 5/2017 |
| EP | 2948247 | B1 | 11/2017 |
| EP | 2743865 | B1 | 6/2019 |
| EP | 2866938 | B1 | 6/2019 |
| EP | 3514732 | A1 | 7/2019 |
| EP | 2232175 | B1 | 8/2019 |
| EP | 3539899 | A1 | 9/2019 |
| EP | 2965266 | B1 | 10/2019 |
| EP | 2492663 | B1 | 12/2019 |
| EP | 3655892 | A1 | 5/2020 |
| EP | 3228191 | B1 | 8/2020 |
| ES | 2467465 | A2 | 6/2014 |
| ES | 2595984 | T3 | 1/2017 |
| FR | 3095602 | A1 | 11/2020 |
| JP | 2000137031 | A | 5/2000 |
| JP | 2005321935 | A | 11/2005 |
| JP | 2007066011 | A | 3/2007 |
| JP | 2008021082 | A | 1/2008 |
| JP | 2008522184 | A | 6/2008 |
| JP | 2012526966 | A | 11/2012 |
| JP | 5278978 | B2 | 5/2013 |
| JP | 2014174647 | A | 9/2014 |
| JP | 2017165487 | A | 9/2017 |
| JP | 2018511782 | A | 4/2018 |
| JP | 2018529062 | A | 10/2018 |
| JP | 2019505042 | A | 2/2019 |
| WO | 9216800 | A1 | 10/1992 |
| WO | 0018225 | A1 | 4/2000 |
| WO | 0105687 | A1 | 1/2001 |
| WO | 0194016 | A1 | 12/2001 |
| WO | 02081743 | A2 | 10/2002 |
| WO | 03061381 | A1 | 7/2003 |
| WO | 2004026661 | A1 | 4/2004 |
| WO | 2005093641 | A1 | 10/2005 |
| WO | 2005109332 | A1 | 11/2005 |
| WO | 2005115621 | A1 | 12/2005 |
| WO | 2006029110 | A1 | 3/2006 |
| WO | 2007024540 | A1 | 3/2007 |
| WO | 2007049039 | A1 | 5/2007 |
| WO | 2007075253 | A2 | 7/2007 |
| WO | 2007092119 | A1 | 8/2007 |
| WO | 2008024471 | A2 | 2/2008 |
| WO | 2008057150 | A1 | 5/2008 |
| WO | 2009003231 | A1 | 1/2009 |
| WO | 2009004366 | A1 | 1/2009 |
| WO | 2009017558 | A1 | 2/2009 |
| WO | 2009094071 | A3 | 10/2009 |
| WO | 2009120596 | A1 | 10/2009 |
| WO | 2009155638 | A1 | 12/2009 |
| WO | 2010037166 | A1 | 4/2010 |
| WO | 2011069190 | A1 | 6/2011 |
| WO | 2011159934 | A2 | 12/2011 |
| WO | 2012100281 | A1 | 8/2012 |
| WO | 2012033605 | A3 | 11/2012 |
| WO | 2012033994 | A3 | 12/2012 |
| WO | 2012033992 | A3 | 4/2013 |
| WO | 2013053011 | A1 | 4/2013 |
| WO | 2010014656 | A3 | 5/2013 |
| WO | 2012034037 | A3 | 5/2013 |
| WO | 2014001819 | A1 | 1/2014 |
| WO | 2014006417 | A1 | 1/2014 |
| WO | 2014009729 | A1 | 1/2014 |
| WO | 2014114938 | A2 | 7/2014 |
| WO | 2014135890 | A1 | 9/2014 |
| WO | 2014157798 | A1 | 10/2014 |
| WO | 2014191757 | A1 | 12/2014 |
| WO | 2015073964 | A1 | 5/2015 |
| WO | 2015109315 | A3 | 10/2015 |
| WO | 2015162680 | A1 | 10/2015 |
| WO | 2016081755 | A1 | 5/2016 |
| WO | 2016120224 | A1 | 8/2016 |
| WO | 2016160984 | A1 | 10/2016 |
| WO | 2016160986 | A3 | 11/2016 |
| WO | 2016200519 | A1 | 12/2016 |
| WO | 2017014999 | A1 | 1/2017 |
| WO | 2017075144 | A1 | 5/2017 |
| WO | 2017109153 | A1 | 6/2017 |
| WO | 2017149468 | A1 | 9/2017 |
| WO | 2017215957 | A1 | 12/2017 |
| WO | 2018000051 | A1 | 1/2018 |
| WO | 2018002287 | A1 | 1/2018 |
| WO | 2018025053 | A1 | 2/2018 |
| WO | 2018039727 | A1 | 3/2018 |
| WO | 2018041516 | A1 | 3/2018 |
| WO | 2018097267 | A1 | 5/2018 |
| WO | 2018215588 | A1 | 11/2018 |
| WO | 2019005450 | A1 | 1/2019 |
| WO | 2019182900 | A1 | 9/2019 |
| WO | 2020033578 | A1 | 2/2020 |
| WO | 2020072945 | A1 | 4/2020 |
| WO | 2021086983 | A1 | 5/2021 |
| WO | 2022066943 | A1 | 3/2022 |

OTHER PUBLICATIONS

Non Final Office Action for U.S. Appl. No. 17/738,981, mailed Apr. 23, 2025, 29 pages.
International Search Report and Written Opinion for PCT/US2021/062676, mailed Apr. 1, 2022, 9 pages.
International Search Report and Written Opinion for PCT/US2021/063608, mailed Apr. 12, 2022, 11 pages.
International Search Report for PCT/US2021/032600, mailed Sep. 3, 2021, 4 pages.
Non-Final Office Action Issued in U.S. Appl. No. 16/840,270, Mailed Sep. 21, 2021, 58 pages.
Notice of Allowance mailed Jan. 4, 2022, for "Cryogenic Vial", U.S. Appl. No. 29/748,815, 9 pages.
Notice of Reasons for Refusal for Japanese Patent Application No. 2021-518707, mailed May 11, 2022, 11 pages.
Office Action dated Sep. 3, 2020, for U.S. Appl. No. 16/840,718, 46 pages.
OXO Airtight Pet Food Storage POP Container. Online published date unknown. Retrieved on May 24, 2022 from URL: https://www.walmart.com/ip/oxo-pet-food-storage-pop-container/623284606, 1 page.
Maggiulli, Roberta , et al., "Implementing an electronic witnessing system into a busy IVF clinic—one clinic's experience", Genera Center for Reproductive Medicine, Rome, Italy, retrieved on Apr. 26, 2021, 2 pages.
Rienzi, Laura , et al., Poster Witness "Electronic Witness System makes patients less concerned about biological sample mix-up errors and comfortable with IOVF clinical practice", Genera Center for Reproductive Medicine, Via de Notaris 2b, 00197, Rome, Italy. 2015, 1 page.
Swedberg, Claire , "Hitachi Chemical Markets Tiny UHF Tag", https://www.rfidjournal.com/hitachi-chemical-markets-tiny-uhf-tag, Sep. 12, 2010, 4 pages.
Thornhill, A. R, et al., Measuring human error in the IVF laboratory using an electronic witnessing system, Monduzzi Editoriale, Proceedings, 17th World Congress on Controversies in Obstetrics, Genecology & Infertility (GOGI), Nov. 8-11, 2012 Lisbon, Portugal, 6 pages.
European Search Report dated Aug. 7, 2023, for European Application No. 19869478.8, 5 pages.
Notice of Allowance for U.S. Appl. No. 29/847,793, mailed Jul. 27, 2023, 2 pages.
"Secure Your Future with Cryofuture", Https://cryofuture.com, 2004, 13 pages.
"Your Partner for Local and Secure Cryostorage and Transportation", http://cryofuture.com, Clinic's workflow, 2024, 12 pages.

(56) References Cited

OTHER PUBLICATIONS

Australian Examination Report mailed Feb. 26, 2024, Application No. 2021348066, 8 pages.
Final Office Action mailed Jul. 15, 2024, for U.S. Appl. No. 18/100,977 in 22 pages.
Notice of Reasons for Refusal. Japanese Application No. 2023-518185, dated Jun. 17, 2024, 8 pages.
Extended European Search Report dated Dec. 18, 2024, for European Application No. 21911908.8-1014, 9 pages.
Notice of Reasons for Refusal, Japanese Application No. 2023-534389, dated May 28, 2024, 9 pages.
Notice of Reasons for Refusal, Japanese Application No. 2023-535428, dated May 30, 2024, 11 pages.
Extended European Search Report dated Jun. 30, 2022, for European Application No. 19869478.8, 9 pages.
International Search Report and Written Opinion for PCT/US2022/028185, mailed Aug. 26, 2022, 11 pages.
"BioStore (TM) III Cryo" 2015, pp. 1-1, XP093203663, Internet Retrieved from the Internet: URL:https://corecryolab.com/wp-content/upl oads/2016/04/Brooks-BioStore-III-Cryo-One-Pager-Automation.
Document titled Description DE102016008869A1, machine translation of DE102016008869A1 provided by Espacenet, original document published 2018, original document already made of record in Applicant's Jun. 10, 2024 IDS (Year: 2018).
Environmental design, eight edition, The Charted institution of Building Services Engineers, 2016, section 3-36.
EP Search Report in EP App No. 22808100.6, mailed Mar. 6, 2025, 9 pages.
European Patent Search Report mailed Sep. 27, 2024 in EP Application No. 21873453.1. in 6 pages.
Extended European Search Report for European Application No. 21904425.2, dated Oct. 9, 2024, 9 pages.
Non Final Office Action for U.S. Appl. No. 17/552,327, mailed Feb. 10, 2025, 15 pages.
"BioStoreTM III Automated LN2 Sample Storage Solutions", Mar. 17, 2020 (Mar. 17, 2020), pp. 1-6, XP093203686.
Non-Final Office Action Issued in U.S. Appl. No. 18/100,977, mailed Jan. 19, 2024, 29 pages.
"Abeyance Web App / Stay Connected", Jul. 6, Abeyance Cry Solutions—Abeyateck, LLC, 2021, 3 pages.
"IVF Witness System: RI Witness TM ART Management System", Confidence, Efficiency and Trust, IVF Witness System—RI Witness—CooperSurgical Fertility Companies https//fertility.coopersurgical.com/equipment/ri-witness—Apr. 19, 2021, 28 pages.
"RI Witness—Confidence, Efficiency and Trust", CooperSurgical, Fertility and Genomic Solutions, Order No. WIT_BRO_001_V13_ROW—Oct. 13, 2020, 13 pages.
"RI Witness—Product guide", CooperSurgical Fertility and Genomic Solutions, Order No. EQU_BRO_004, V1: ROW Oct. 24, 2018, 12 pages.
"S840 Lab Mover", Large Volume LNS Dry Vapor Shipper, Products Shipping, Jul. 6, Abeyance Cry Solutions—Abeyateck, LLC, 2021, 3 pages.
"Simple, Secure—190° C. LN2 Vapor Storage", Products Shipping, Jul. 6, Abeyance Cry Solutions—Abeyateck, LLC, 2021, 7 pages.
Brady printer Range, "Everyone is Unique" Continual cryopreservation monitoring from RI Witness, CooperSurgical, Inc. Order No. WIT_FLY_010_V2_US Oct. 14, 2020, 3 pages.
Comley, J., "New approaches to sample identification tracking and technologies for maintaining the quality of stored samples," Drug Discovery World Summer 2017, 11 pages.
CooperSurgical, RI Witness, Order No. CE 60010312 Version 3-ROW: Oct. 24, 2018, 12 pages.
Cryogenic Vials, Standard. Online, published date unknown. Retrieved on Dec. 8, 2021 from URL: https://www.nextdayscience.com/cryogenic-vials-standard.htm.
CX100 Cryo Express Dry Shipper With Shipping Case. Online, published date unknown. Retrieved on May 24, 2022 from URL:https://www.mitegen.com/product/cryo-express-dry-shipper-cx100-with-case, 2 pages.
FluidX Tri-Coded Jacket: 0.7ml Sample Storage Tube with External Thread; Brooks Life Sciences; https://bioinventory.biostorage.com, 2019, 7 pages.
HID Beyond Cool: RFID disentangles cryopreservation storage and management, 2015, 4 pages.
Ihmig et al., "Frozen cells and bits," IEEE Pulse, Sep. 2013, 9 pages.
International Preliminary Report on Patentability and Written Opinion from PCT Application No. PCT/GB2005/002048 dated Aug. 23, 2005, 9 pages.
International Search Report and Written Opinion for International Application No. PCT/US2020/057779, Mailed on Jun. 17, 2021, 12 pages.
International Search Report and Written Opinion for PCT/US2020/057764, Mailed Date: Feb. 19, 2021, 14 pages.
International Search Report and Written Opinion for PCT/US2020/060565, mailed Mar. 8, 2021, 11 pages.
International Search Report and Written Opinion for PCT/US2021/051803, mailed Jan. 12, 2022, 6 pages.
Final Office Action for U.S. Appl. No. 17/552,327, mailed May 2, 2025, 23 pages.
Non Final Office Action for U.S. Appl. No. 18/100,977, mailed Jun. 4, 2025, 33 pages.

* cited by examiner

A
P1
T
26
16
18
24
22

T
A
16
20
22

T
A
16
22

T
A
16
20
22

T
A
16
22

T
A
16
22

T
A
16
20
22

T
A
16
22

T
A
16
20
22

T
A
16
22

T
A
16
22

RFID ENABLED SPECIMEN HOLDER

BACKGROUND

Technical Field

The present disclosure relates generally to systems and methods of specimen collection, and specifically to an RFID enabled specimen holder used to collect and store biological specimen and facilitate identification of stored biological specimen, for example during an IVF procedure.

Description of the Related Art

Long-term preservation of cells and tissues through cryopreservation has broad impacts in multiple fields including tissue engineering, fertility and reproductive medicine, regenerative medicine, stem cells, blood banking, animal strain preservation, clinical sample storage, transplantation medicine, and in vitro drug testing. This can include the process of vitrification in which a biological sample (e.g., an oocyte, an embryo, a biopsy) contained in or on a storage device (e.g., a cryopreservation straw, cryopreservation tube, stick or spatula) is rapidly cooled by placing the biological sample and the storage device in a substance, such as liquid nitrogen. This results in a glass-like solidification or glassy state of the biological sample (e.g., a glass structure at the molecular level), which maintains the absence of intracellular and extracellular ice (e.g., reducing cell damage and/or death) and, upon thawing, improves post-thaw cell viability. To ensure viability, the vitrified biological samples are then typically continuously stored in a liquid nitrogen dewar or other container, which is at a temperature conducive to cryopreservation, for example negative 196 degrees Celsius.

There are, however, a number of concerns in how these biological samples are being stored, identified, managed, inventoried, retrieved, etc.

For example, each harvested embryo is loaded on a rigid embryo straw, tube, stick or spatula. The tube may be open at one end that receives the harvested embryo and closed (e.g., plugged) at the other end. The cryopreservation storage devices containing or holding the embryos are cooled as quickly as possible by plunging the cryopreservation storage device with the biological material into liquid nitrogen at a temperature of approximately negative 196 degrees Celsius, for example to achieve vitrification.

More particularly, multiple cryopreservation storage devices are placed in a goblet for placement in the liquid nitrogen storage tank. The goblet attaches to the liquid nitrogen storage tank such that the multiple cryopreservation storage devices are suspended in the liquid nitrogen. Labels that are manually written-on using a suitable marker pen or printed using a custom printer are attached to the straw and/or the goblet. Such labels can include identification information corresponding to the individual that the embryo was harvested from and other suitable information (e.g., a cryopreservation storage device number, a practitioner number, etc.).

Stored biological samples can be identified by writing on the storage devices themselves, or by labels stuck to the storage devices. These labels may be handwritten or printed and can include bar codes. However, such methods of identification have associated disadvantages. Written notes on containers can be erased or smudged and labels can fall off the storage devices while they are stored inside the dewar leading to unidentifiable samples. These problems are exacerbated by the cold conditions in which biological samples are kept.

When performing an audit of biological samples stored in cold storage (typically at temperatures of negative 196 degrees Celsius), warming of the samples to a temperature greater than negative 130 degrees Celsius is to be avoided. It is therefore desirable to minimize the amount of time spent outside of the dewar wherever possible.

Recording, monitoring and auditing of samples in cold storage takes a considerable amount of time and effort, even when samples are labelled using barcodes. An additional and undesirable increase in the time taken to record or audit samples arises as a result of frost which can form on the surfaces of the storage devices and their labels when they are removed from liquid nitrogen into relatively warmer temperatures. A layer of frost blocks optical observance of the identification information, and the layer of frost also diffracts the light of a bar code reader. The container cannot be warmed up to remove frost as this would lead to destruction of the sample. The frost can be wiped off the disposable container but this contributes to an undesirable increase in the amount of time taken to read the sample.

Accordingly, it is desirable to provide a new apparatus for collecting, preserving, and identifying biological samples (e.g., vitrified biological samples) at suitably cold temperatures.

BRIEF SUMMARY

According to one aspect of the disclosure, a specimen holder includes a stick elongate along a longitudinal direction. The stick has a distal end and a proximal end, the proximal end opposite the distal end with respect to the longitudinal direction. The stick includes an outer surface and a distal portion of the outer surface that is closer to the distal end than the proximal end. The distal portion of the outer surface carries a specimen upon engagement of the stick with the specimen. The stick further includes a first terminal end, a second terminal end, and an internal cavity that extends from the first terminal end to the second terminal end. The stick includes a midplane that is normal to the longitudinal direction, and the midplane is located equidistant between the distal end and the proximal end. The first terminal end, the second terminal end and an entirety of the internal cavity are all located between the midplane and the proximal end.

According to another aspect of the disclosure, a method of retaining a specimen includes contacting a specimen with a distal end of a stick that is elongate along a longitudinal direction. The stick has a proximal end opposite the distal end with respect to the longitudinal direction. The stick includes a first terminal end, a second terminal end, and an internal cavity that extends from the first terminal end to the second terminal end. The stick includes a midplane that is normal to the longitudinal direction, and the midplane is located equidistant between the distal end and the proximal end. The first terminal end, the second terminal end and an entirety of the internal cavity are all located between the midplane and the proximal end.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale.

For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
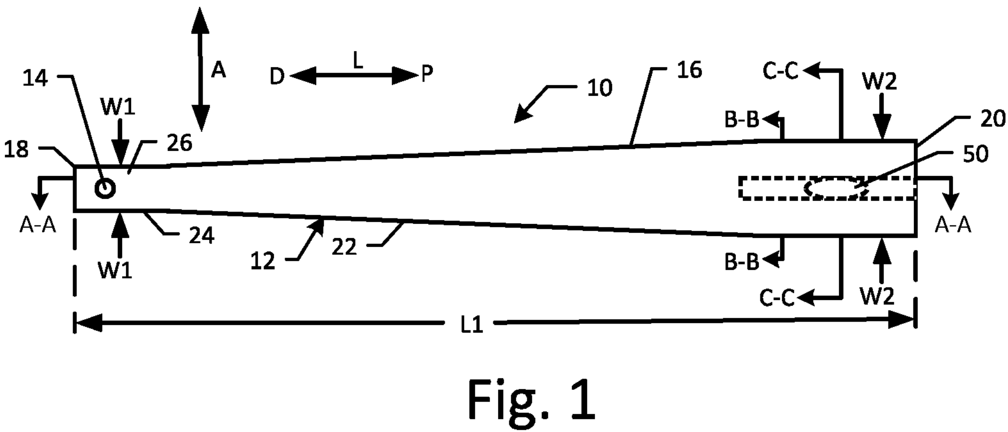
FIG. 1 is a top, plan view of a specimen holder, according to one embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with specimen holders have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," "an embodiment," or "an aspect of the disclosure" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Reference herein to two elements "facing" or "facing toward" each other indicates that a straight line can be drawn from one of the elements to the other of the elements without contacting an intervening solid structure. Reference herein to two elements being "directly coupled" indicates that the two elements physically touch with no intervening structure between. Reference herein to a direction includes both vectors that make up said direction. For example a longitudinal direction includes both a "distal" vector and a "proximal" vector, which is opposite the "distal" vector. Reference to an element extending along a direction means the element extends along one or both of the vectors that make up the direction.

The term "aligned" as used herein in reference to two elements along a direction means a straight line that passes through one of the elements and that is parallel to the direction will also pass through the other of the two elements. The term "between" as used herein in reference to a first element being between a second element and a third element with respect to a direction means that the first element is closer to the second element as measured along the direction than the third element is to the second element as measured along the direction. The term "between" includes, but does not require that the first, second, and third elements be aligned along the direction.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein.

Aspects of the disclosure will now be described in detail with reference to the drawings, wherein like reference numbers refer to like elements throughout, unless specified otherwise. Certain terminology is used in the following description for convenience only and is not limiting. The term "plurality", as used herein, means more than one. The terms "a portion" and "at least a portion" of a structure include the entirety of the structure.

The headings and Abstract of the Disclosure provided herein are for convenience only and do not interpret the scope or meaning of the embodiments.

Referring to FIGS. 1 to 16, a specimen holder 10 includes a body 12 that carries a specimen 14, such as a biological materials and/or samples (e.g., eggs, sperm, zygotes). The body 12 may be in the form of a stick 16 as shown in the illustrated embodiment. According to another embodiment, the body 12 may be in the form of, for example, a spatula, a straw, or a tube. The body 12 may be a monolithic structure, according to one embodiment.

The stick 16 may be elongate along a direction, for example a longitudinal direction L, as shown in the illustrated embodiment. The stick 16, may include a distal end 18 and a proximal end 20. As shown in the illustrated embodiment, the proximal end 20 may be opposite the distal end 18 with respect to the longitudinal direction L. According to one embodiment, the stick 16 may extend in a distal vector D of the longitudinal direction L and terminate at the distal end 18, and the stick 16 may extend in a proximal vector P of the longitudinal direction L, opposite the distal vector D, and terminate at the proximal end 20.

The distal end 18 may include a surface that faces in the distal vector D, as shown in the illustrated embodiment. The proximal end 20 may include a surface that faces in the proximal vector P, as shown in the illustrated embodiment. The stick 16 has a length L1 measured from one of the distal end 18 and the proximal end 20 to the other of the distal end 18 and the proximal end 20 along the longitudinal direction L.

The stick 16 may include an outer surface 22 that extends from the distal end 18 to the proximal end 20. According to one embodiment, the outer surface 22 includes any surface does not face toward any portion of the stick 16. The outer surface 22 may include a distal portion 24 that carries the specimen 14 upon engagement of the stick 16 with the specimen 14. As shown in the illustrated embodiment, the distal portion 24 of the outer surface 22 may be closer to the distal end 18 than the distal portion 24 of the outer surface 22 is from the proximal end 20.

The distal portion 24 may include a specimen surface 26 shaped to retain the specimen 14, for example against a force of gravity when the stick 16 is arranged such that the longitudinal direction L is parallel to the force of gravity. The specimen surface 26 may be substantially planar, as shown in the illustrated embodiment. The specimen surface 26 may be curved, for example concave according to one embodiment. The specimen surface 26 may include texturing, grooves, or both.

The distal portion 24 may have a non-circular cross-sectional shape within a distal plane P1 that is normal to the longitudinal direction D and that intersects the distal portion 24. According to one embodiment, the distal plane P1 may further intersect the distal end 18, the specimen surface 26, or both.

The stick 16 may have a width measured from one point on the outer surface 22 to another point on the outer surface 22 that is opposite the one point with respect to a lateral direction A, which is perpendicular to the longitudinal direction L. The width may vary at different locations along the length L1 of the stick 16. For example, the stick 16 may have a minimum width W1 at the distal portion 24, for example at the distal end 18. The stick 16 may have a maximum width W2 at a location proximal of the distal portion 24, for example at the proximal end 20. According to one embodiment, the distal portion 24 may include a constant width along the length of the distal portion 24. According to another embodiment, the width may taper along the distal portion 24.

The stick 16 may have a thickness measured from one point on the outer surface 22 to another point on the outer surface 22 that is opposite the one point with respect to a transverse direction T, which is perpendicular to both the longitudinal direction L, and the lateral direction A. The thickness may vary at different locations along the length L1 of the stick 16. For example, the stick 16 may have a minimum thickness T1 at the distal portion 24, for example at the distal end 18. The stick 16 may have a maximum thickness T2 at a location proximal of the distal portion 24, for example at the proximal end 20. According to one embodiment, the distal portion 24 may include a constant thickness along the length of the distal portion 24. According to another embodiment, the thickness may taper along the distal portion 24.

As shown in the illustrated embodiment, the distal portion 24 may be shaped such that the width of the distal portion 24, for example the minimum width W1, is greater than the thickness of the distal portion 24, for example the minimum thickness T1. As shown in the illustrated embodiment, the proximal end 20 may be shaped such that the width of the proximal end 20, for example the maximum width W2, is greater than the thickness of the proximal end 20, for example the maximum thickness T2.

The stick 16 may further include a first terminal end 30, a second terminal end 32, and an internal cavity 34 that extends from the first terminal end 30 to the second terminal end 32. The stick 16 may have a midplane P2 that is normal to the longitudinal direction L, and that is located equidistant between the distal end 18 and the proximal end 20 with respect to the longitudinal direction L. As shown in the illustrated embodiment, the first terminal end 30, the second terminal end 32, and an entirety of the internal cavity 34 may all be located between the midplane P2 and the proximal end 20 with respect to the longitudinal direction L.

The stick 16 may have a proximal quarter plane P3 that is normal to the longitudinal direction L, and that is located equidistant between the midplane P2 and the proximal end 20 with respect to the longitudinal direction L. As shown in the illustrated embodiment, the first terminal end 30, the second terminal end 32, and an entirety of the internal cavity 34 may all be located between the proximal quarter plane P3 and the proximal end 20 with respect to the longitudinal direction L.

The stick 16 may have a proximal tip plane P4 that is normal to the longitudinal direction L, and that is located equidistant between the proximal quarter plane P3 and the proximal end 20 with respect to the longitudinal direction L. According to one embodiment, the first terminal end 30, the second terminal end 32, and an entirety of the internal cavity 34 may all be located between the proximal tip plane P4 and the proximal end 20 with respect to the longitudinal direction L.

Figure 2:
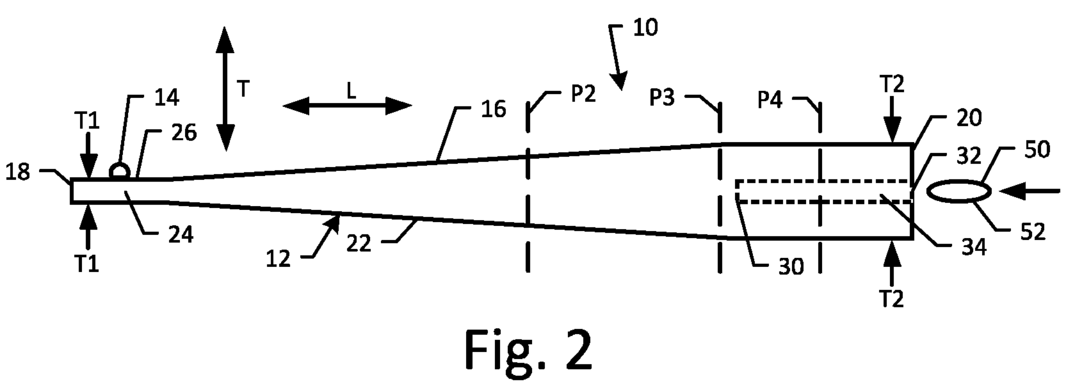
FIG. 2 is a side, elevation view of the specimen holder illustrated in FIG. 1.
Figure 3:
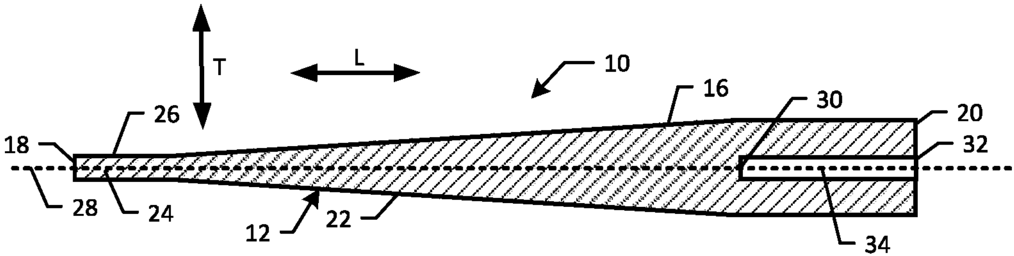
FIG. 3 is a cross-sectional view of the specimen holder illustrated in FIG. 1, along line A-A.

Referring to FIGS. 1 to 3, the internal cavity 34 may be a borehole that extends through the second terminal end 32, which is an entry opening in the outer surface 22, for example the proximal end 20, and terminates at the first terminal end 30, which is an inner surface of the stick 16. As shown in the illustrated embodiment, the first terminal end 30 and the second terminal end 32 may be aligned with respect to the longitudinal direction L. The stick 16 may be shaped such that the distal end 18, the proximal end 20, the first terminal end 30, and the second terminal end 32 are all aligned with respect to the longitudinal direction L. For example, the stick 16 may include a central axis 28 that is parallel to the longitudinal direction L, and that intersects each of the distal end 18, the proximal end 20, the first terminal end 30, and the second terminal end 32.

Figure 4:
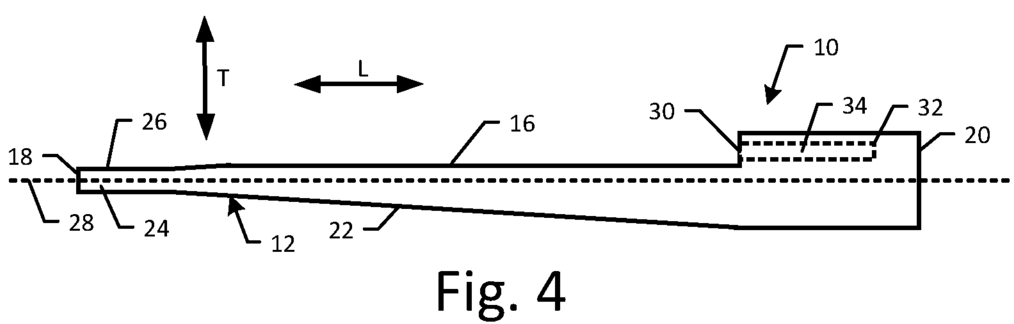
FIG. 4 is a side, elevation view of a specimen holder according to one embodiment.

Referring to FIG. 4, the internal cavity 34 may be a borehole that extends through the first terminal end 30, which is an entry opening in the outer surface 22, for example a surface distal of the proximal end 20, and terminates at the second terminal end 32, which is an inner surface of the stick 16. As shown in the illustrated embodiment, the first terminal end 30 and the second terminal end 32 may be aligned with respect to the longitudinal direction L. According to one embodiment, the first terminal end 30 and the second terminal end 32 may be offset from the central axis 28 with respect to a direction perpendicular to the longitudinal direction L, for example the transverse direction T.

Figure 5:
FIG. 5 is a side, elevation view of a specimen holder according to one embodiment.

Referring to FIG. 5, the internal cavity 34 may be a through hole that extends through the first terminal end 30, which is an entry opening in the outer surface 22, for example a surface distal of the proximal end 20, and extends through the second terminal end 32, which is an exit opening in the outer surface 22, for example the proximal end 20. As shown in the illustrated embodiment, the first terminal end 30 and the second terminal end 32 may be aligned with respect to the longitudinal direction L. According to one embodiment, the first terminal end 30 and the second terminal end 32 may be offset from the central axis 28 with respect to a direction perpendicular to the longitudinal direction L, for example the transverse direction T.

Figure 6:
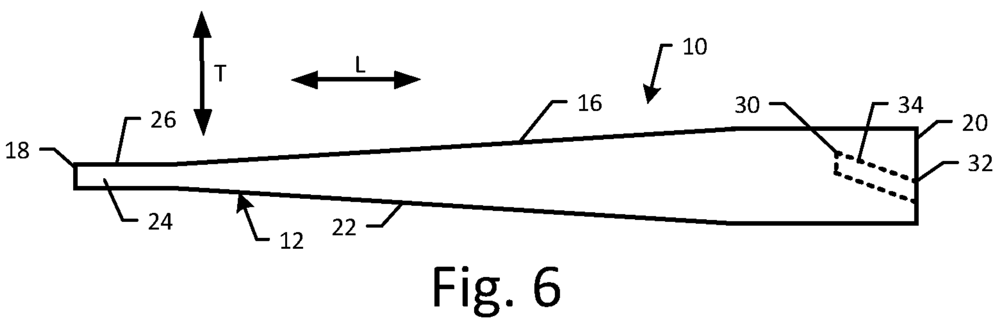
FIG. 6 is a side, elevation view of a specimen holder according to one embodiment.

Referring to FIG. 6, the internal cavity 34 may be a borehole that extends through the second terminal end 32, which is an entry opening in the outer surface 22, for example the proximal end 20, and terminates at the first terminal end 30, which is an inner surface of the stick 16. As shown in the illustrated embodiment, the first terminal end 30 and the second terminal end 32 may be out of alignment with respect to the longitudinal direction L.

Figure 7:
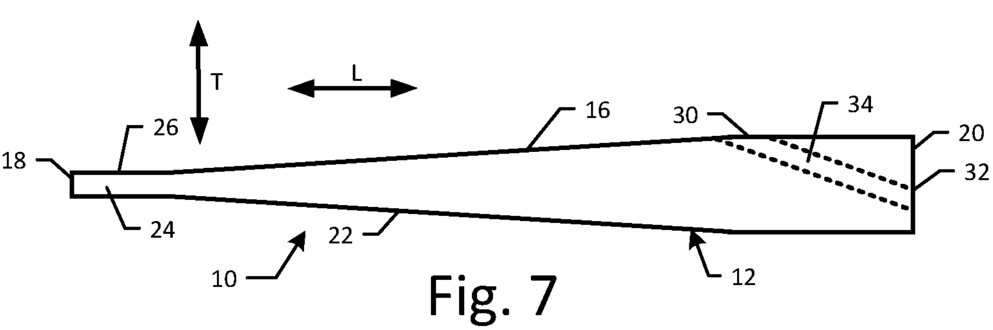
FIG. 7 is a side, elevation view of a specimen holder according to one embodiment.

Referring to FIG. 7, the internal cavity 34 may be a through hole that extends through the first terminal end 30, which is an entry opening in the outer surface 22, for example a surface distal of the proximal end 20, and extends through the second terminal end 32, which is an exit opening in the outer surface 22, for example the proximal end 20. As shown in the illustrated embodiment, the first terminal end 30 and the second terminal end 32 may be out of alignment with respect to the longitudinal direction L.

Figure 8:
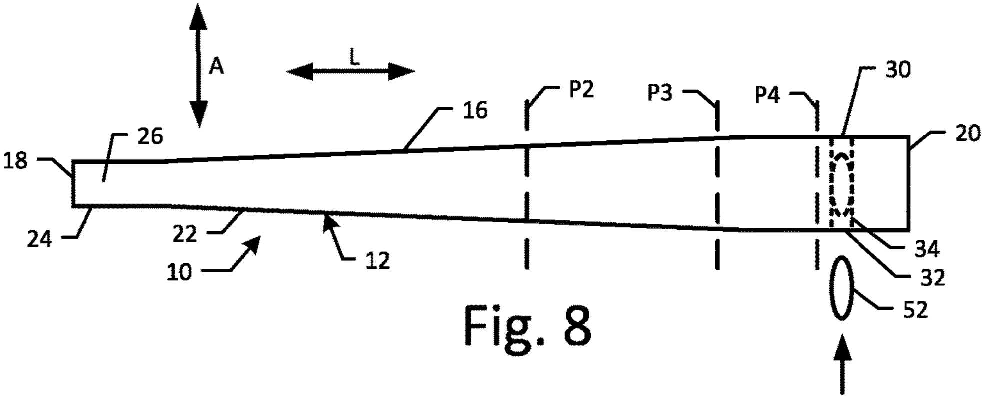
FIG. 8 is a side, elevation view of a specimen holder according to one embodiment.
Figure 9:
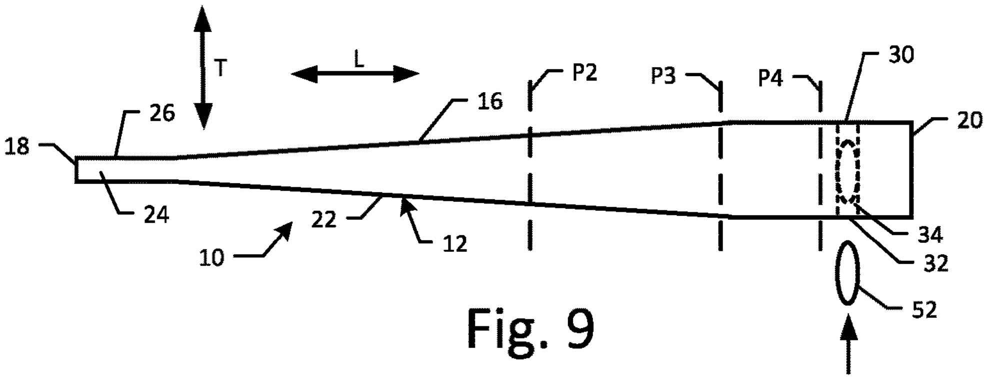
FIG. 9 is a side, elevation view of a specimen holder according to one embodiment.

Referring to FIGS. 8 and 9, the first terminal end 30 and the second terminal end 32 may be aligned with respect to a direction perpendicular to the longitudinal direction L, for example the lateral direction A (as shown in FIG. 8), or the transverse direction T (as shown in FIG. 9).

Referring to FIGS. 12 to 15, the stick 16 may include a vent 36 that extends through the outer surface 22 of the stick 16 and intersects with the internal cavity 34 at a location between the first terminal end 30 and the second terminal end 32.

Figure 16:
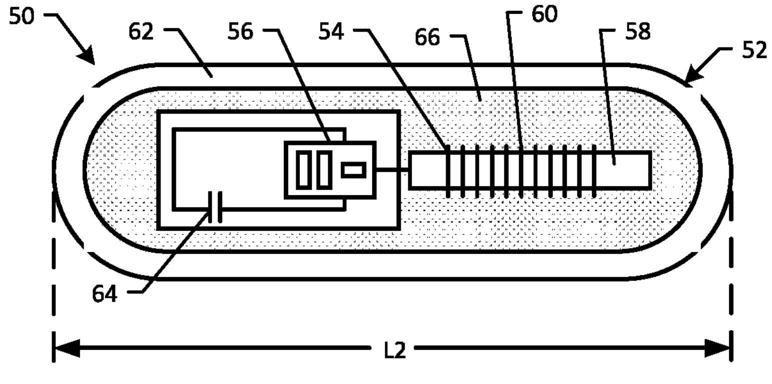
FIG. 16 is a side, elevation view of an RFID tag according to one embodiment.
Figure 17:
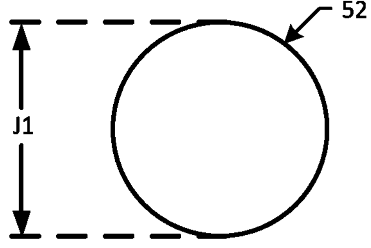
FIG. 17 is a front elevation view of the RFID tag illustrated in FIG. 16.
Figures 18, 19, 20, 21, 22, 23, 24, 25, 26, 27, 28:
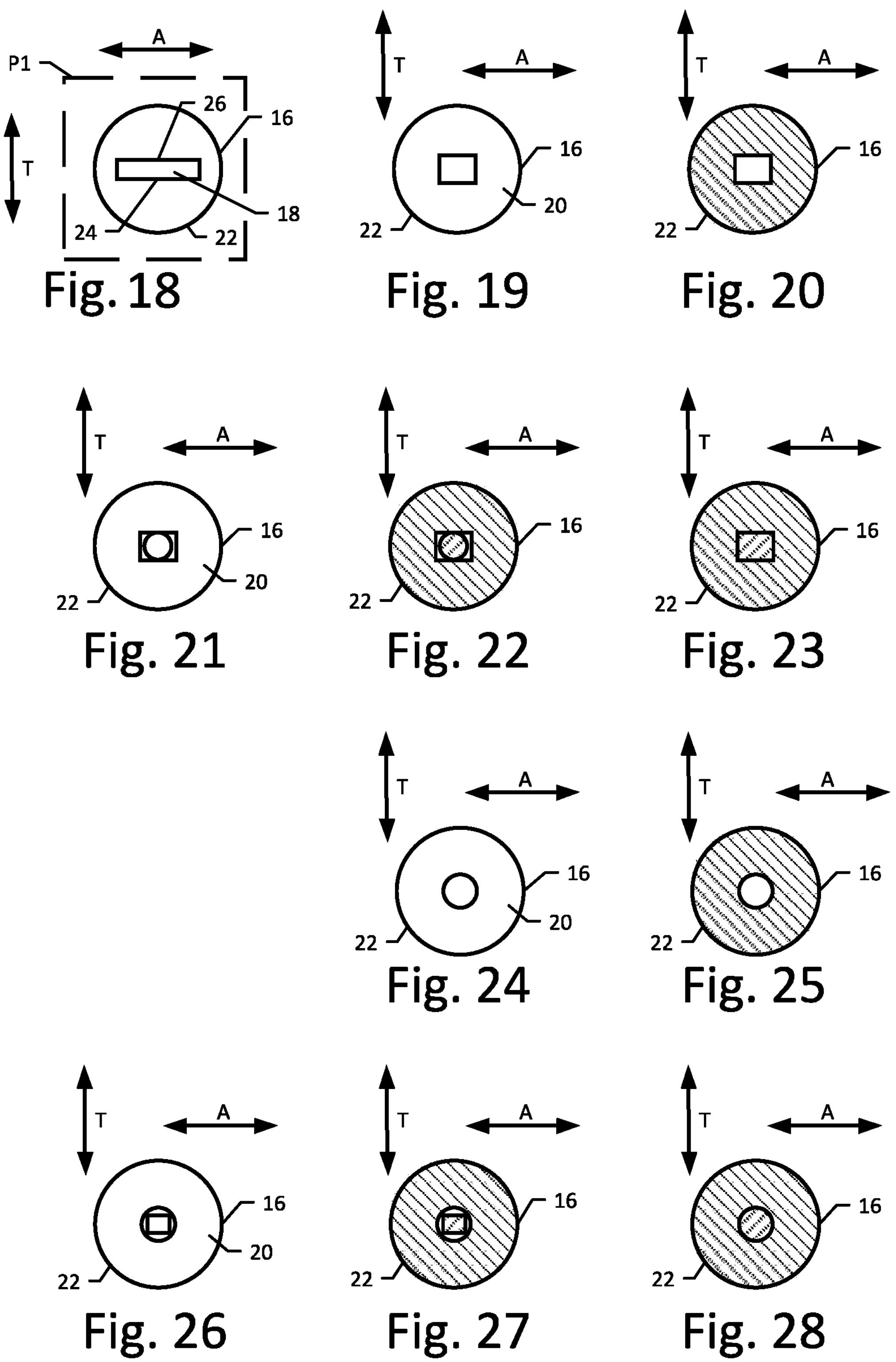
FIG. 18 is a front, plan elevation of the specimen holder illustrated in FIG. 1, according to one embodiment.
FIG. 19 is a rear, elevation view of the specimen holder illustrated in FIG. 1, according to one embodiment.
FIG. 20 is a cross-sectional view of the specimen holder illustrated in FIG. 1, along line B-B, according to one embodiment.
FIG. 21 is a rear, elevation view of the specimen holder illustrated in FIG. 1, according to one embodiment.
FIG. 22 is a cross-sectional view of the specimen holder illustrated in FIG. 1, along line C-C, according to one embodiment.
FIG. 23 is a cross-sectional view of the specimen holder illustrated in FIG. 1, along line C-C, according to one embodiment.
FIG. 24 is a rear, elevation view of the specimen holder illustrated in FIG. 1, according to one embodiment.
FIG. 25 is a cross-sectional view of the specimen holder illustrated in FIG. 1, along line B-B, according to one embodiment.
FIG. 26 is a rear, elevation view of the specimen holder illustrated in FIG. 1, according to one embodiment.
FIG. 27 is a cross-sectional view of the specimen holder illustrated in FIG. 1, along line C-C, according to one embodiment.
FIG. 28 is a cross-sectional view of the specimen holder illustrated in FIG. 1, along line C-C, according to one embodiment.

Referring to FIGS. 16 and 17, the specimen holder 10 may include a wireless transponder 50. The wireless transponder 50 may take a variety of forms. For example, active, passive, or battery-assisted radio frequency identification transponders (RFID tags) 52 employ an integrated circuit to store and return a unique identifier. Active RFID transponders include a dedicated power source (e.g., a chemical battery cell) to power the RFID transponder. Passive RFID transponder do not include a dedicated power source, but rather derive power from an interrogation signal, typically charging a capacitor, which provides sufficient power to provide a return signal (e.g., back scatter signal) with unique identifying information imposed thereof. Battery-assisted RFID transponders generally detect an interrogation signal, but employ a dedicated power source (e.g., chemical battery cell) to primarily power the operations.

Also for example, micro-electro-mechanical systems (MEMS) transponders employ one or typically more mechanical elements which mechanically vibrate or oscillated at respective frequencies to return a unique identifier. These MEMS transponders are mechanically based and typically do not employ integrated circuits, nor do they typically store unique identifiers in memory. The terms "integrated circuit RFID transponder" and "non-MEMS RFID transponder" are used herein to distinguish non-mechanical RFID transponders from mechanical or MEMS based transponders.

The wireless transponder 50 is able to withstand cold temperatures (e.g., negative 150 degrees Celsius; negative 196 degrees Celsius) and continue to operate. In particular, the wireless transponders 50 are preferably able to withstand multiple instances of temperature cycling between cold temperatures (e.g., negative 150 degrees Celsius; negative 196 degrees Celsius) and relatively warmer temperatures to which the containers may be exposed when removed from a cryogenic cooler or dewar. The wireless transponder 50 may advantageously take the form of passive wireless transponders, which rely on power from interrogation signals to provide responses, for example via backscattering. MEMS transponders may be particularly suitable for operation at cold temperatures.

The RFID tag 52 has an antenna 54, which is coupled to a transponder circuit 56 (e.g., radio, transmitter, backscatter circuit). As shown, the antenna 54 may include a ferrite rod 58 with a coil 60 wound around the ferrite rod 58. The RFID tag 52 may include a housing 62 that encapsulates the antenna 54, the transponder circuit 56, and a power source 64 (e.g., capacitor, chemical battery). As shown an interior space between the housing 62 and the antenna 54, the transponder circuit 56, and the power source 64 may be occupied by a potting agent 66.

The RFID tag 52 may have a length L2 measured from one end of the RFID tag 52 to an opposite end of the RFID tag 52 along a direction of elongation of the RFID tag 52. The RFID tag 52 may have a cross-sectional dimension J1 measured along a direction perpendicular to the direction of elongation of the RFID tag 52. According to one embodiment, the length L2 is about 12 mm and the cross-sectional dimension J1 is about 2 mm. According to one embodiment, the length L2 is about 8 mm and the cross-sectional dimension J1 is about 1.4 mm.

Although the RFID tag 52 is shown as a cylindrical or capsule shape, it will be appreciated that the shape of the RFID tag may vary, and may be selected so as to facilitate insertion into the internal cavity 34. As shown, a leading edge of the RFID tag 52 may be tapered, or have rounded edges so as to limit interference during entry of the RFID tag 52 into the internal cavity 34.

Referring to FIGS. 1 to 15, the RFID tag 52 is sized so as to be insertable into the internal cavity 34. For example, the RFID tag 52 may be sized so as to be press fit into the internal cavity 34. Accordingly, the internal cavity 34 may have a cross-sectional dimension K1 and the cross-sectional dimension J1 of the RFID tag 52 may be greater than or equal to the cross-sectional dimension K1 of the internal cavity 34. Alternatively, or in addition to the RFID tag 52 being press fit into the internal cavity 34, the RFID tag 52 may be shrink fit within the internal cavity 34 (described in further detail below). The internal cavity 34 may be completely filled by the RFID tag 52, a plastic, an epoxy, a glass, or any combination thereof, such that the internal cavity 34 is devoid of any pockets of air. For example, the RFID tag may be an RFID glass capsule wireless transponder, in which the housing comprises a glass capsule that encapsulates the integrated circuit and the antenna. The RFID glass capsule wireless transponder may be press fit or shrink fit in the internal cavity of the stick.

According to one embodiment, the specimen holder 10 may include only one internal cavity 34, such that when the RFID tag 52 is positioned within the internal cavity 34 the specimen holder 10 is devoid of any internal cavities that are open to the outer surface 22 and that do not contain the RFID tag 52. The specimen holder 10 may include only one bore hole, for example the internal cavity 32, that extends into but not completely through the stick 16.

Figure 10:
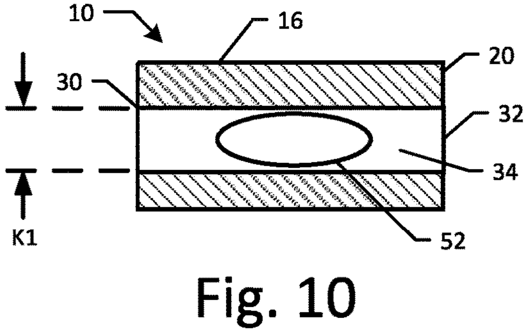
FIG. 10 is a cross-sectional view of a portion of a specimen holder according to one embodiment.
Figure 11:
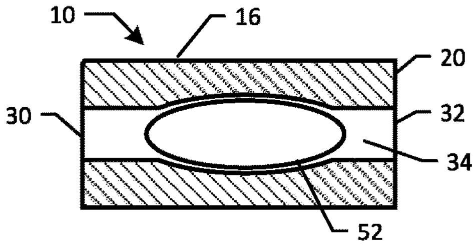
FIG. 11 is a cross-sectional view of a portion of a specimen holder according to one embodiment.
Figure 12:
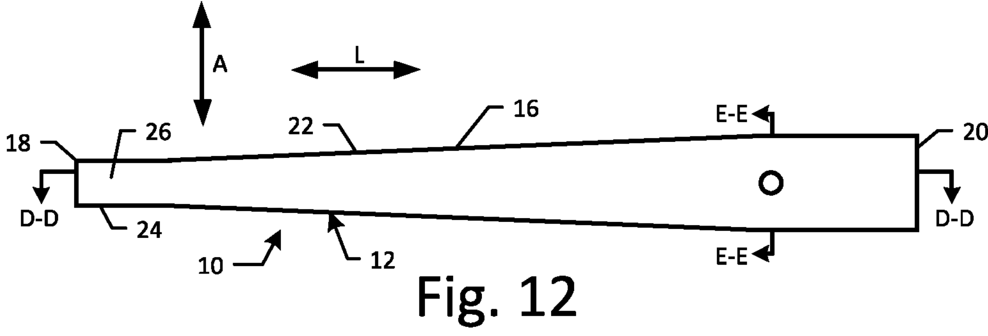
FIG. 12 is a top, plan view of a specimen holder, according to one embodiment.
Figure 13:
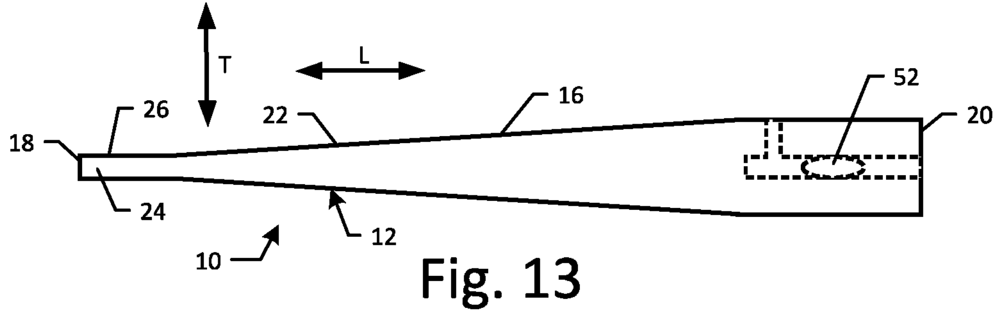
FIG. 13 is a side, elevation view of the specimen holder illustrated in FIG. 12.
Figure 14:
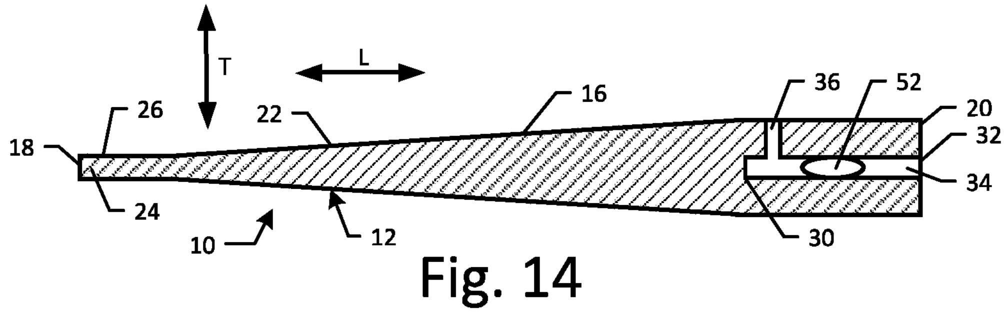
FIG. 14 is a cross-sectional view of the specimen holder illustrated in FIG. 12, along line D-D.
Figure 15:
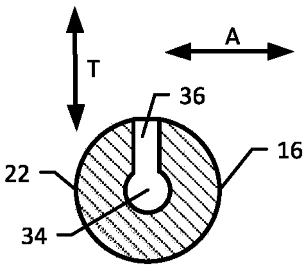
FIG. 15 is a cross-sectional view of the specimen holder illustrated in FIG. 12, along line E-E, according to one embodiment.

As shown in FIG. 10, sizes, materials, or both of the RFID tag 52 and the stick 16 may be selected such that insertion of the RFID tag into the internal cavity 34 results in no deformation of the stick 16. As shown in FIG. 11, sizes, materials, or both of the RFID tag 52 and the stick 16 may be selected such that insertion of the RFID tag into the internal cavity 34 results in deformation (e.g., elastic deformation or plastic deformation) of the stick 16.

Referring to FIGS. 19 to 28, various cross-sectional shapes (e.g., circles, polygonal shapes, irregular shapes, etc.) of the RFID tag 52 and the internal cavity 34 may be selected. According to one embodiment, the cross-sectional shape of the RFID tag 52 is different than the cross-sectional shape of the internal cavity 34. According to one embodiment, the cross-sectional shape of the RFID tag 52 is the same as the cross-sectional shape of the internal cavity 34.

Referring to FIGS. 1 to 28, a method of retaining the specimen 14 may include contacting the specimen 14 with the distal portion 24 of the stick 16. The method may include inserting the RFID tag 52 through either the first terminal end 30 or the second terminal end 32 and positioning the RFID tag 52 within the internal cavity 34. According to one embodiment inserting the RFID tag 52 is performed prior to the contacting step. According to one embodiment inserting the RFID tag 52 is performed subsequent to the contacting step.

The method may further include scanning the RFID tag 52 positioned within the internal cavity 34 with an RFID reader, and associating information transmitted by the RFID tag 52 with information about the specimen 14, for example the identity of the patient who contributed the sample.

The method may include lowering a temperature of the stick 16, thereby shrinking the cross-sectional dimension K1 of the internal cavity 34, and thereby securing the RFID tag 52 within the internal cavity 34 via a shrink fit. The stick 16 may include a first material and the housing 62 of the RFID tag 52 may include a second material. According to one embodiment, the first material has a coefficient of thermal expansion that is larger than a coefficient of thermal expansion of the second material such that lowering the temperature of the stick 16 with the RFID tag 52 inside the internal cavity 34 results in the stick 16 shrinking more than the RFID tag 52.

Referring to FIGS. 29 to 33, a specimen collection system 1000 may include a container 1100 for holding biological samples, the container including a vial 1104 and a cap 1106, the vial 1104 being at least partially covered by an outer jacket 1107, also called an outer sleeve or frame, according to at least one embodiment. The cap 1106 is sized and shaped to removably close an opening 1120 at a first end 1112*a* of the vial 1104. The vial 1104 has the first end 1112*a*, a second end 1112*b*, and a side wall 1114. The second end 1112*b* is opposed from the first end 1112*a* across a length of the vial 1104, and the side wall 1114 extends between the first and the second ends 1112*a*, 1112*b* to delimit an interior of the vial 1104 from an exterior thereof.

The vial 1104 has an opening 1120 at the first end 1112*a* thereof, and the second end 1112*b* may be closed or sealable. The vial 1104 takes the form of a tube, which may have a circular profile or cross section, or alternatively may have other shapes (e.g., rectangular, hexagonal, octagonal). The opening 1120 of the vial 1104 may, for example, be circular, although the opening 1120 may have other shapes. The second end 1112*b* of the vial 1104 may, for example, terminate in a semi-spherical tip or may be frustoconical, terminating in a flat surface 1122 which is perpendicular to the longitudinal axis of the vial 1104.

Figure 30:
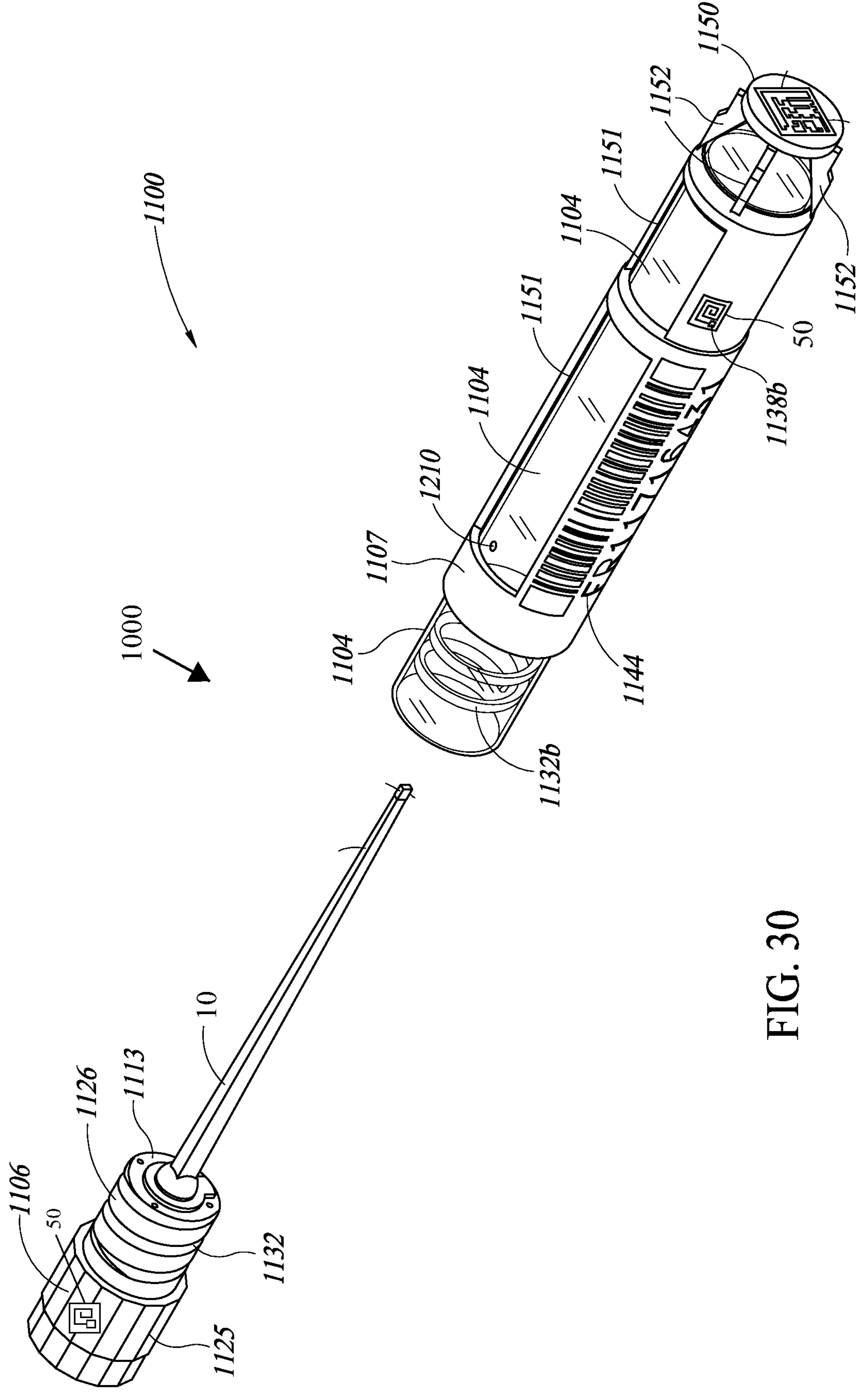
FIG. 30 is an isometric view of the container illustrated in FIG. 29 with the cap removed therefrom, with the specimen holder extending from the cap as an integral, permanently fixed, or removably-attached element, according to at least one embodiment.

As shown in FIG. 30, the specimen holder 10 may extend from the cap 1106 as an integral, permanently fixed, or removably-attached element, according to at least one implementation. The specimen holder 10 may have a generally solid form having no through passage (e.g., a stick, spatula, sampling rod). The specimen holder 10 may extend from a bottom surface 1113, i.e., interior-facing surface, of the cap.

Figure 31:
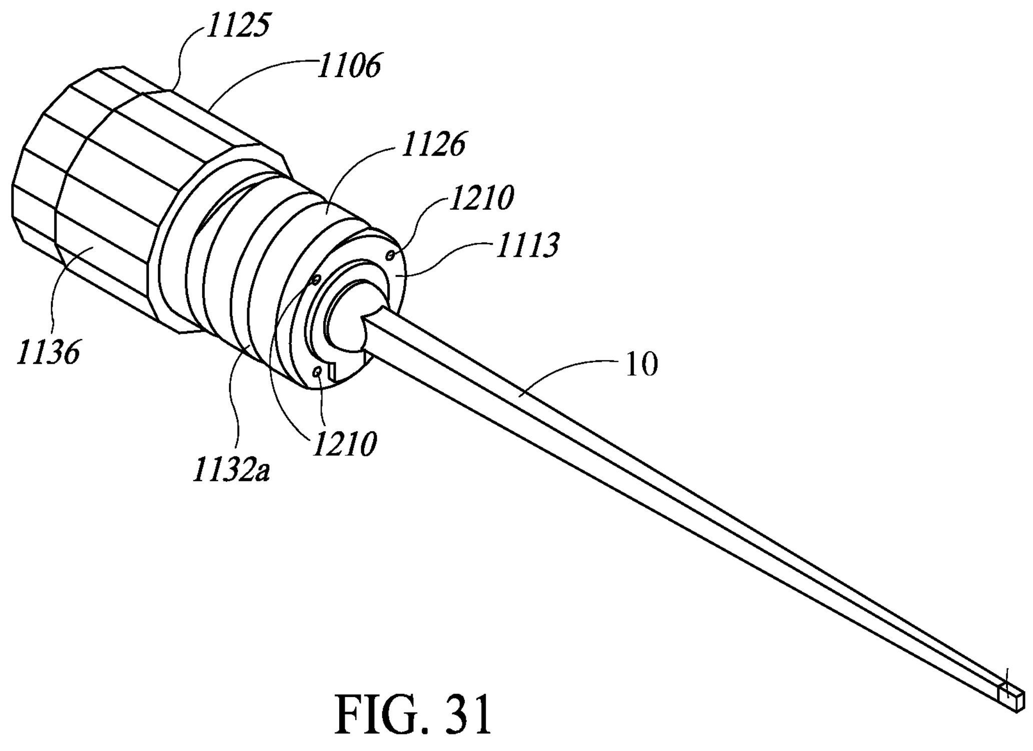
FIG. 31 is an isometric view of the cap of the vial of FIG. 30 with the specimen holder fixed to a bottom surface of the cap, according to at least one embodiment.
Figure 32:
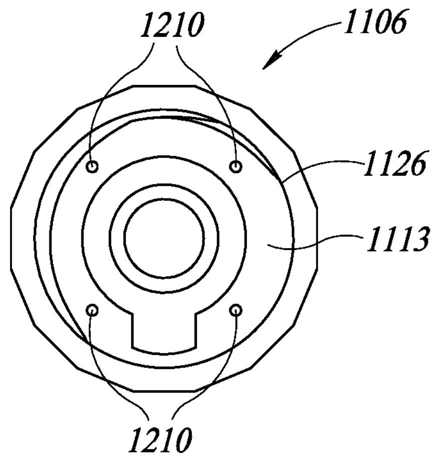
FIG. 32 is a bottom, plan view of the cap of the vial of FIG. 30 without an attached specimen holder, according to at least one embodiment.
Figure 32:

As shown in FIG. 31 the specimen holder 10 may be fixed to bottom surface 1113 of the cap 1106, according to at least one embodiment. The specimen holder 10 may be fixed to the bottom surface 1113 of the cap 1106 in any of a variety of ways. For example, the specimen holder 10 and the cap 1106 may take the form of a unitary single piece construction, for instance molded as a single unitary and optionally monolithic part. Also for example, the specimen holder 10 may be interference or friction fitted in an aperture in the bottom surface 1113 of the cap 1106. Also for example, the specimen holder 10 may be adhered to the bottom surface 1113 of the cap 1106.

The specimen holder 10 and the cap 1106 may be a single, unitary structure. The cap 1106 may have a top portion 1125 and a side wall 1126 extending from the top portion 1125, the side wall 1126 delimiting a portion of the cap 1106 which is smaller in extent relative to the top portion 1125 in a direction transverse to the longitudinal axis of the vial 1104 so that the side wall 1126 can be inserted into the interior of the vial 1104, the top portion 1125 acting as a stopper to limit the depth of insertion of the side wall 1126 into the vial 1104. The cap 1106 may have threads 1132*a*, for example on an outer surface of the side wall 1126 to mate with corresponding threads 1132*b* on an inner surface of the side wall 1114 of the vial 1104.

Figure 33:
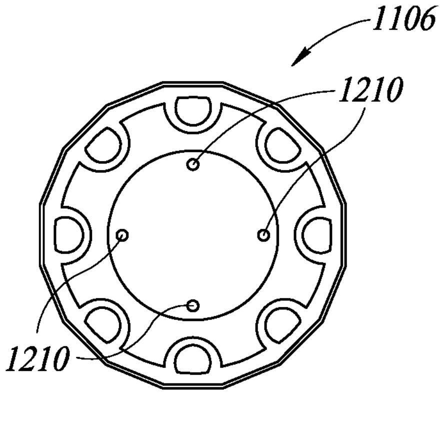
FIG. 33 is a top, plan view of the cap of the vial of FIG. 30 without an attached specimen holder, according to at least one embodiment.

Implementations may advantageously include a number of ports and/or vents 1210 (as shown in FIG. 33). The ports advantageously allow ingress of liquid (e.g., liquid nitrogen) into an interior of the vial 1104 while the cap 1106 is in place on the vial 1104, while the vents allow gas (e.g., air) to escape from the interior of the vial 1104 as liquid enters the vial 1104 while the cap 1106 is in place on the vial 1104. The ports may be located in the vial 1104, in the cap 1106, or in both the vial 1104 and the cap 1106. The vents 1210 may be located in the cap 1106 (four shown in FIGS. 30-33), in the vial 1104 (one shown in FIG. 30), or in both the cap 1106 and the vial 1104.

The ports and vents 1210 provide ingress and egress between the interior of the vial 1104 and the exterior while the cap 1106 is secured to the vial 1104. Preferably, the vents 1210 are located toward the top (e.g., in the cap or at least proximate the top of the vial), while the ports are positioned toward the bottom (e.g., at least proximate the bottom of the vial), which allows liquid to leach in from the bottom of the container 1100 and gas to vent out from the top as the container 100 is lowered into a cryogenic bath, e.g., in a dewar.

Although the term "vent" has been used herein to describe through-holes (which are not necessarily round), which allow gas (e.g., air) to escape the vial 1104 and the term "port" has been used to describe through-holes which allow liquid nitrogen into the vial 1104, these terms are interchangeable in some cases. For example, the structure of the through-holes used for the vents 1210 and ports may be simple apertures and therefore may function primarily as vents 1210 or ports depending on their position relative to the top and bottom of the container 1100 and depending on operational conditions (e.g., depending on whether a container 1100 is being lowered into or raised out of a cryogenic bath).

In some implementations, the ports and vents 1210 may include valves, flaps, screens, filters, or other structures, to restrict the flow of gas or liquid to a specific direction vis-à-vis the interior of the vial 1104 and this may result in structures which act as dedicated ports or vents 1210. In some cases, the outer jacket 1107 (discussed below) may include through-holes in correspondence with the through-holes in the vial 1104 to facilitate ingress and egress of liquid and/or air.

The cap 1106 may be formed of any of a variety of materials, for example polymers, for instance thermoplastics, such as polypropylene or poly-ethylene, and/or any other suitable material that withstand temperatures common in cryogenic applications without significant degradation. An outer surface of the top portion 1125 of the cap 1106 may include a plurality of facets 1136 to facilitate gripping when tightening or loosening the cap 1106. While the cap 1106 is generally illustrated as having a portion thereof securely received within the opening of the vial 1104, in some implementations, the cap 1106 may alternatively be sized to receive a portion of the vial 1104 within an opening in the cap 1106.

The container may include an outer jacket 1107 covering at least a portion of an exterior surface of the vial 1104. The outer jacket 1107 is shaped and sized to allow the vial 1104 to be received within a top opening of the jacket 1107. Both the vial 1104 and the outer jacket 1107 may have, for example, a circular cross-section such that the circumference of an exterior surface of the vial 1104 is approximately equal to a circumference of an inner surface of the jacket 1107. Such a configuration allows for a snug fit between the vial 1104 and the outer jacket 1107. In implementations, the second end 1112*b* of the vial 1104, e.g., the frustoconical tip which terminates in a flat surface 1122, may extend from a bottom opening of the jacket 1107.

The inner surface of the jacket 1107 may be attached to the exterior surface of the vial, e.g., friction fitted, heat fitted, and/or via adhesive, in implementations in which the outer jacket 1107 is to remain associated with the particular vial throughout the lifecycle of the container 1100. In some implementations, the inner surface of the jacket 1107 may be removably attached to the exterior surface of the vial 1104 to allow removal and replacement of the outer jacket 1107, e.g., if the outer jacket 1107 is to be associated with more than one vial 1104 (or vice versa). In such a case, there may be an elastic compression fit and/or a friction fit between the vial 1104 and the outer jacket 1107.

In implementations, the inner surface of the jacket 1107 and/or the exterior surface of the vial 1104 may include deformable protrusions (not shown) which compress elastically to form a compression fit between the vial 1104 and the outer jacket 1107. In implementations, the inner surface of the jacket 1107 and/or the exterior surface of the vial 1104 may include opposing threads or ridges to secure the vial 1104 within the outer jacket 1107 (or, in other words, to secure the outer jacket to the vial). In implementations, outer jackets 1107 may be manufactured separately from vials 1100 and, for example, retrofitted onto existing vials 1104.

The outer jacket 1107 may have openings 1151 (see FIGS. 29 and 30) through which the exterior surface of the vial 1104 is visible, thereby allowing the contents of the vial 1104 to be seen in implementations in which the vial 1104 is transparent or translucent. The openings 1151 may have longer sides which run in a direction along the longitudinal axis of the outer jacket 1107 and shorter sides which run in a direction transverse to the longitudinal axis of the outer jacket 1107 and curve around the circumference of the vial.

Figure 29:
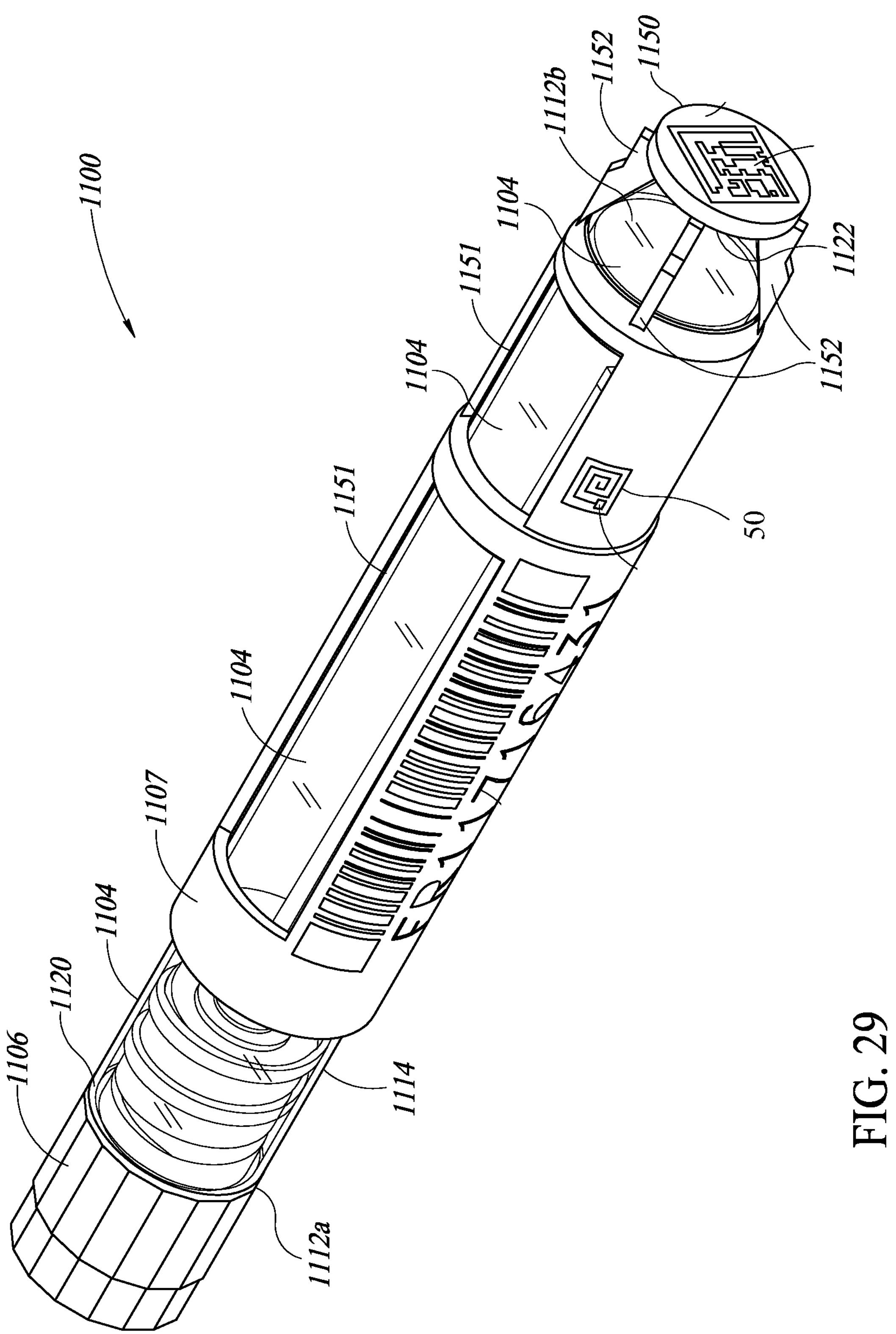
FIG. 29 is an isometric view of a container for holding specimen, the container including a vial and a cap, the vial being at least partially covered by an outer jacket or sleeve, according to at least one embodiment.

In implementations, an arrangement of arms 1152 may extend from the bottom opening of the jacket 1107 in a longitudinal direction of the outer jacket 1107 to support a platform 1150, e.g., a solid, disk-shaped platform, which is oriented in a plane which is transverse to the longitudinal axis of the outer jacket 1107 (see FIGS. 29, 30, and 35). For example, there may be four arms 1152 at positions which are 90 degrees apart around the circumference of the outer jacket 1107. The arms 1152 and the platform 1150 may be positioned and sized so that an inner surface of the platform 1150 forms a bottom interior surface of the jacket 1107. The bottom interior surface of the jacket 1107 may be in contact with, or nearly in contact with, the bottom portion of the vial 1104 when the vial is received in the outer jacket 1107. The platform 1150 may be attached to the ends of the arms 1152 or may be integrally formed with the arms 1152, such as, for example, in a thermoplastic manufacturing process. The container 1100 may include one or more of the wireless transponders 50. According to one embodiment, the one or more wireless transponders 50 may be carried by the vial 1104, the cap 1106, or both the vial 1104 and the cap 1106.

Figure 34:
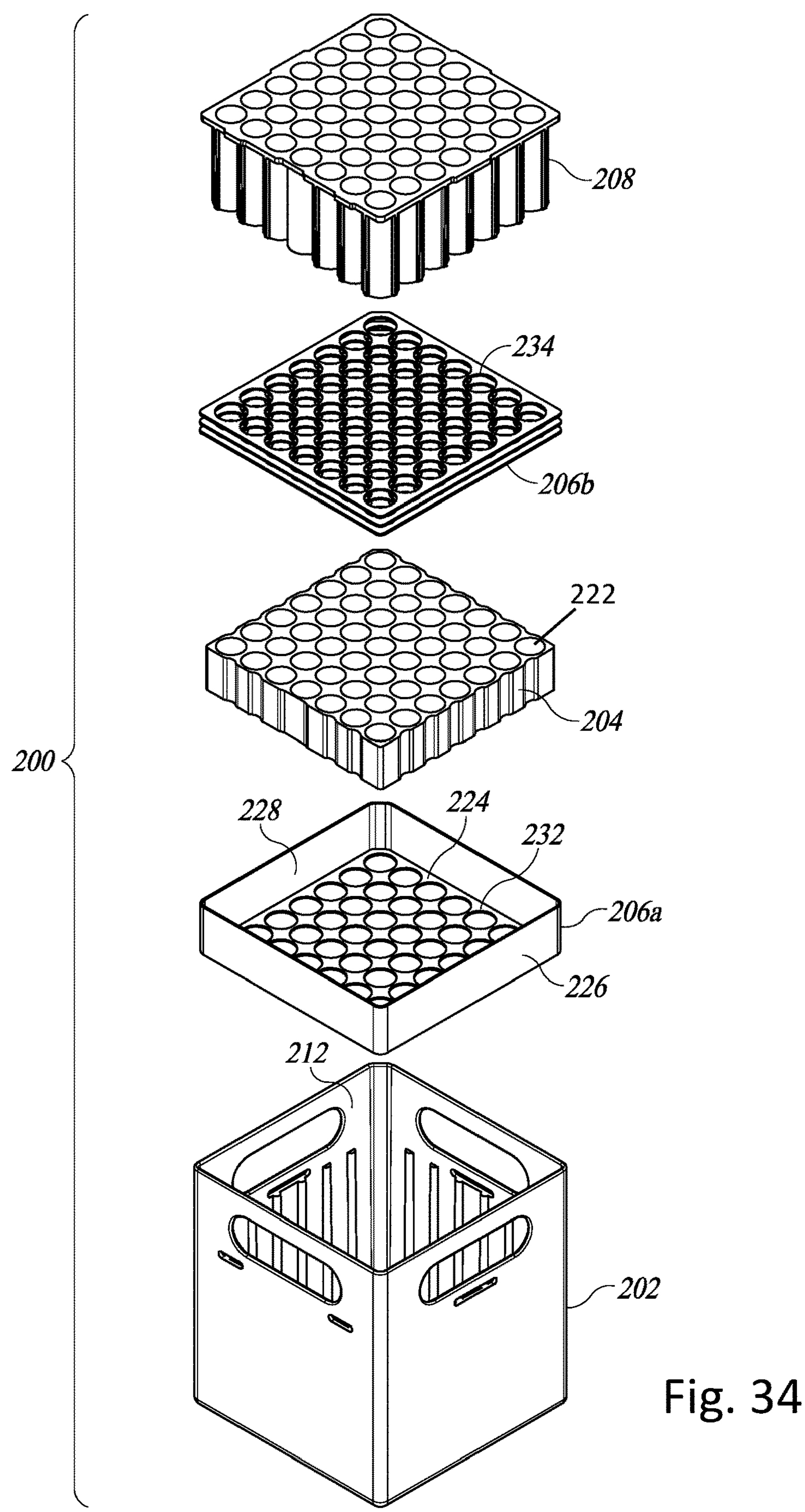
FIG. 34 is an exploded view of a bulk carrier, according to one embodiment.

Referring to FIG. 34, a bulk carrier 200 maintain cryogenic conditions for an array of the containers 1100, for example 49 separate ones of the containers 1100, according to at least one implementation. The bulk carrier 200 may include a carrier box 202, a thermal shunt 204, thermal insulation 206*a*, 206*b* (collectively 206) around the thermal shunt 204, and a top spacer 208.

The thermal shunt 204 may have an outer profile that is sized and shaped to be closely received in the interior 212 of the carrier box 202. The profile may be asymmetrical to ensure that thermal shunt 204 is positioned correctly in the interior 212 of the carrier box 202. The thermal shunt 204 may be made of any of a variety of materials, preferably having a relatively large thermal mass as compared to the materials to be stored in the carrier box 202. Suitable materials for the thermal shunt 204 may include, for example, slabs of non-ferrous metals, or metal impregnated polymers where the metal is a non-ferrous metal or the metal is in the form of small pieces, particles or strands that are sufficiently small and discontinuous as to prevent or retard the formation of currents therethrough. In at least some implementations, the thermal shunt 204 takes the form of an aluminum plate, slab, or slug.

The thermal shunt 204 has an array of through-holes 222 (only one called out in FIG. 34) extending therethrough. The through-holes 222 are shaped and sized to closely receive respective ones of the containers 1100 extending therethrough. In the illustrated implementation, the through-holes 222 of the thermal shunt 204 are arranged in a 7 by 7 array to accommodate a total of 49 containers 1100.

The thermal insulator(s) 206 may be sized and shaped to be closely received in the interior of the carrier box 202. The thermal insulator 206 may be provided in two parts, a thermal insulation tray 206*a* and a thermal insulation plate 206*b*. The thermal insulation tray 206*a* has a base 224 and an upstanding side wall 226, that forms a space 228 therebetween. An outer surface of the upstanding side wall 226 is shaped and dimensioned to be closely received in the interior 212 of the carrier box 202. The thermal insulation plate 206*b* has an outer periphery which is of a shape and size so as to be closely received in the space 228 by an inner surface of the upstanding side wall 226 of the thermal insulation tray 206*a*, in a nested configuration. The thermal insulation tray 206*a* and thermal insulation plate 206*b* may sandwich the thermal shunt 204, for example thermally insulating the thermal shunt 204 on all sides thereof. The thermal insulation tray 206*a* and thermal insulation plate 206*b* may be made of any of a variety of materials, preferably having a relatively large thermal resistance or R factor. Some suitable materials may include, but are not limited to, aerogels.

Both the thermal insulation tray 206*a* and thermal insulation plate 206*b* has a respective array of through-holes 232, 234 (only one called out for each array), respectively, extending therethrough. The through-holes 232, 234 are shaped and sized to closely receive respective ones of the containers 1100 extending therethrough. When the thermal insulation tray 206*a* and thermal insulation plate 206*b* are positioned in the interior 212 of the cavity box 202, the through-holes 232, 234 of the thermal insulation tray 206*a* and thermal insulation plate 206*b* should align with respective ones of the through-holes 222 of the thermal shunt 204. In the illustrated implementation, the through-holes 232, 234 of the thermal insulation tray 206*a* and thermal insulation plate 206*b* are arranged in a 7 by 7 array to accommodate a total of 49 the containers 1100.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

Many of the methods described herein can be performed with variations. For example, many of the methods may include additional acts, omit some acts, and/or perform acts in a different order than as illustrated or described. The various embodiments described above can be combined to provide further embodiments. All of the commonly assigned U.S. patent application publications, U.S. patent applications, foreign patents, and foreign patent applications referred to in this specification and/or listed in the Application Data Sheet, including but not limited to U.S. patent application No. 62/936,133, filed Nov. 15, 2019, entitled "RFID ENABLED SPECIMEN HOLDER" are each incorporated herein by reference, in their entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A specimen holder comprising:

a stick elongate along a longitudinal direction, the stick having a distal end, a proximal end, and a monolithic body extending therebetween, the proximal end opposite the distal end with respect to the longitudinal direction, the monolithic body including an outer surface and a distal portion of the outer surface that is closer to the distal end than the proximal end, the distal portion of the outer surface carries a specimen upon engagement of the stick with the specimen, the stick further including a first terminal end, which is an inner surface of the stick, a second terminal end formed by an entry opening in the outer surface, and an internal cavity in the form of a borehole that extends from the first terminal end to the second terminal end, the stick including a midplane that is normal to the longitudinal direction, the midplane located equidistant between the distal end and the proximal end, wherein the first terminal end, the second terminal end and an entirety of the internal cavity are all located between the midplane and the proximal end;

wherein the stick includes a vent that extends through the outer surface of the monolithic body and intersects with the internal cavity at a location between the first terminal end and the second terminal end; and a radio frequency identification (RFID) tag including an integrated circuit with stored identification information and an antenna coupled to the integrated circuit so as to transmit the stored identification information, the RFID tag further including a housing that encloses both the integrated circuit and the antenna, wherein the RFID tag is positioned within the internal cavity.

2. The specimen holder of claim 1 wherein:

the stick includes a proximal quarter plane located equidistant between the midplane and the proximal end; and the first terminal end, the second terminal end and an entirety of the internal cavity are all located between the proximal quarter plane and the proximal end.

3. The specimen holder of claim 2 wherein:

the stick includes a proximal tip plane located equidistant between the proximal quarter plane and the proximal end; and the first terminal end, the second terminal end and an entirety of the internal cavity are all located between the proximal tip plane and the proximal end.

4. The specimen holder of claim 1 wherein the distal end has a first width measured along a lateral direction, which is perpendicular to the longitudinal direction, the proximal end has a second width measured along the lateral direction, and the second width is greater than the first width, the distal end has a first thickness measured along a transverse direction, which is perpendicular to both the longitudinal direction and the lateral direction, the proximal end has a second thickness measured along the transverse direction, and the second thickness is greater than the first thickness, the first width is greater than the first thickness, and the second width is equal to the second thickness.

5. The specimen holder of claim 1 wherein the first terminal end includes one of: 1) an entry opening in an outer surface of the monolithic body; or 2) an inner surface of the stick beyond which the internal cavity does not extend.

6. The specimen holder of claim 5 wherein the second terminal end includes one of: 1) an exit opening in an outer surface of the monolithic body; or 2) an inner surface of the stick beyond which the internal cavity does not extend.

7. The specimen holder of claim 1 wherein the first terminal end and the second terminal end are aligned with respect to the longitudinal direction.

8. The specimen holder of claim 7 wherein the distal end, the proximal end, the first terminal end, and the second terminal end are all aligned with respect to the longitudinal direction.

9. The specimen holder of claim 1 wherein the internal cavity has a circular cross-section within a proximal plane normal to the longitudinal direction.

10. The specimen holder of claim 1 wherein the internal cavity has a non-circular cross-section within a proximal plane normal to the longitudinal direction.

11. The specimen holder of claim 1 wherein the stick includes a first material and the housing includes a second material, and the first material has a coefficient of thermal expansion that is larger than a coefficient of thermal expansion of the second material.

12. The specimen holder of claim 11, wherein the RFID tag is shrink fit into the internal cavity.

13. The specimen holder of claim 1 wherein the RFID tag is press fit into the internal cavity.

14. The specimen holder of claim 1 wherein:

the second terminal end includes the inner surface of the stick beyond which the internal cavity does not extend, and the RFID tag is positioned within the internal cavity such that the location at which the vent intersects the internal cavity is between the RFID tag and the second terminal end.

15. The specimen holder of claim 1 wherein the RFID tag is an RFID glass capsule wireless transponder, the housing comprising a glass capsule which encapsulates the integrated circuit and the antenna, and the RFID glass capsule wireless transponder is press fit or shrink fit in the internal cavity of the stick.

* * * * *